US012800510B2

(12) United States Patent
Lenser et al.

(10) Patent No.: US 12,800,510 B2
(45) Date of Patent: Nov. 17, 2026

(54) SYSTEM AND METHOD FOR QUALITY CONTROL INSPECTION OF UNITARY PROTRUSIONS IN A SUBSTRATE

(71) Applicant: The Procter & Gamble Company, Cincinnati, OH (US)

(72) Inventors: Todd Douglas Lenser, Liberty Township, OH (US); Jared T. Ducker, Cincinnati, OH (US); Robert G. Heringer, Cincinnati, OH (US); Randall Allen Myers, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 316 days.

(21) Appl. No.: 18/451,145

(22) Filed: Aug. 17, 2023

(65) Prior Publication Data

US 2024/0060905 A1 Feb. 22, 2024

Related U.S. Application Data

(60) Provisional application No. 63/399,838, filed on Aug. 22, 2022.

(51) Int. Cl.
*G01N 21/88* (2006.01)
*G05B 19/418* (2006.01)

(52) U.S. Cl.
CPC ... *G01N 21/8851* (2013.01); *G05B 19/41875* (2013.01); *G01N 2021/888* (2013.01)

(58) Field of Classification Search
CPC ......... G01N 21/8851; G01N 2021/888; G05B 19/41875
See application file for complete search history.

(56) References Cited

U.S. PATENT DOCUMENTS 3,940,307 A 2/1976 Rivman
4,100,656 A 7/1978 Moertel
4,167,055 A 9/1979 Molnar
4,255,533 A 3/1981 Bartz
(Continued)

FOREIGN PATENT DOCUMENTS

CN 102890093 A 1/2013
CN 106052602 A 10/2016
(Continued)

OTHER PUBLICATIONS

Extended European Search Report and Search Opinion for Application No. 23191844.2, dated Jan. 9, 2024, 8 pages.
(Continued)

*Primary Examiner* — Jamil Ahmed
(74) *Attorney, Agent, or Firm* — Gregory P. Habiak; Christian M. Best

(57) ABSTRACT

A method is presented of forming protrusions in a portion of a substrate. The method may include providing a first device comprising an outer surface; providing a second device including a source of vibration energy; forming a nip between the source of vibration energy and the outer surface; conveying the substrate through the nip; forming the protrusions in the portion of the substrate in the nip using the source of vibration energy; and inspecting one or more characteristics of the substrate using a vision system.

18 Claims, 16 Drawing Sheets

(56) References Cited

U.S. PATENT DOCUMENTS

| | | | |
|---|---|---|---|
| 4,362,450 | A | 12/1982 | Hasegawa |
| 4,394,208 | A | 7/1983 | Wang |
| 4,966,829 | A | 10/1990 | Yasuda |
| 5,522,613 | A | 6/1996 | Heeb |
| 5,997,981 | A | 12/1999 | Mccormack et al. |
| 6,224,699 | B1 | 5/2001 | Bett |
| 6,598,276 | B2 | 7/2003 | Shepard |
| 6,684,464 | B1 | 2/2004 | Mody |
| 6,773,527 | B2 | 8/2004 | Campbell et al. |
| 6,869,659 | B2 | 3/2005 | Shepard |
| 7,636,988 | B2 | 12/2009 | Zhang |
| 7,748,090 | B2 | 7/2010 | Seth |
| 8,269,830 | B1 | 9/2012 | Delaney |
| 8,440,257 | B2 | 5/2013 | Mandzsu |
| 8,562,774 | B2 | 10/2013 | Efremova |
| 8,745,827 | B2 | 6/2014 | Rocha |
| 8,784,722 | B2 | 7/2014 | Rocha |
| 9,011,402 | B2 | 4/2015 | Roe |
| 9,180,059 | B2 | 11/2015 | Roe |
| 9,183,443 | B2 | 11/2015 | Eames |
| 9,265,673 | B2 | 2/2016 | Stabelfeldt et al. |
| 9,265,674 | B2 | 2/2016 | Hancock-cooke et al. |
| 9,282,790 | B2 | 3/2016 | Rocha et al. |
| 9,434,051 | B2 | 9/2016 | Hsu |
| 9,444,995 | B2 | 9/2016 | Northrup |
| 9,795,194 | B2 | 10/2017 | Rocha |
| 9,830,694 | B2 | 11/2017 | Bryll |
| 10,076,162 | B2 | 9/2018 | Rocha |
| 10,095,091 | B2 | 10/2018 | Costa |
| 10,097,743 | B2 | 10/2018 | Rodriguez |
| 10,159,313 | B2 | 12/2018 | Rocha et al. |
| 10,165,833 | B2 | 1/2019 | Pariseau |
| 10,405,614 | B2 | 9/2019 | Rocha |
| 10,657,419 | B2 | 5/2020 | Kurtz |
| 10,687,588 | B2 | 6/2020 | Emslander |
| 10,709,619 | B2 | 7/2020 | Chandrasekaran |
| 10,776,949 | B2 | 9/2020 | Haven |
| 10,798,997 | B2 | 10/2020 | Rocha |
| 10,953,592 | B2 | 3/2021 | Rocha |
| 10,981,321 | B2 | 4/2021 | Rocha |
| 11,020,946 | B2 | 6/2021 | Peet |
| 11,058,186 | B2 | 7/2021 | Rocha |
| 11,196,185 | B2 | 12/2021 | Spinella |
| 11,334,082 | B2 | 5/2022 | Frick |
| 2004/0175030 | A1* | 9/2004 | Prince ........................ G06T 7/44 382/150 |
| 2004/0218727 | A1 | 11/2004 | Shoenfeld |
| 2004/0263777 | A1 | 12/2004 | Kim |
| 2007/0132610 | A1 | 6/2007 | Guernalec |
| 2007/0150084 | A1* | 6/2007 | Grubb .................... G06Q 10/00 700/110 |
| 2009/0244361 | A1 | 10/2009 | Gebauer |
| 2012/0279023 | A1 | 11/2012 | Burout |
| 2017/0265602 | A1* | 9/2017 | Rocha ..................... B29C 59/04 |
| 2019/0224054 | A1 | 7/2019 | Silfverstrand et al. |
| 2019/0387846 | A1 | 12/2019 | Rocha |
| 2020/0179184 | A1 | 6/2020 | Kaiser |
| 2021/0007912 | A1* | 1/2021 | Swedberg ......... A61F 13/15756 |
| 2023/0112098 | A1 | 4/2023 | Koga |
| 2024/0140048 | A1 | 5/2024 | Lenser |
| 2024/0216183 | A1 | 7/2024 | Lenser |
| 2024/0399730 | A1 | 12/2024 | Lenser et al. |

FOREIGN PATENT DOCUMENTS

| | | | | | |
|---|---|---|---|---|---|
| CN | 206764826 | U | | 12/2017 | |
| CN | 208592851 | U | | 3/2019 | |
| CN | 110631517 | A | | 12/2019 | |
| CN | 209894115 | U | | 1/2020 | |
| CN | 112140058 | A | | 12/2020 | |
| CN | 112198158 | A | | 1/2021 | |
| CN | 113450375 | A | | 9/2021 | |
| CN | 214264609 | U | | 9/2021 | |
| CN | 109909984 | B | | 11/2021 | |
| CN | 214682992 | U | | 11/2021 | |
| CN | 214749832 | U | | 11/2021 | |
| DE | 102015208337 | A1 | | 12/2015 | |
| EP | 4079271 | A1 | | 10/2022 | |
| EP | 4265399 | A1 | | 10/2023 | |
| JP | H09309168 | A | | 12/1997 | |
| JP | 2000185785 | A | | 7/2000 | |
| JP | 2002350731 | A | * | 12/2002 | ........... G01N 21/956 |
| JP | 4033078 | B2 | | 11/2007 | |
| JP | 2010175392 | A | * | 8/2010 | ........... G01N 21/892 |
| JP | 2015112929 | A | | 6/2015 | |
| JP | 2020085862 | A | * | 6/2020 | ............. G01N 21/89 |
| JP | 1704253 | S | | 1/2022 | |
| KR | 101758729 | B1 | | 7/2017 | |
| KR | 101808142 | B1 | | 12/2017 | |
| KR | 102217795 | B1 | | 2/2021 | |
| KR | 102316688 | B1 | | 10/2021 | |
| WO | 0111445 | A2 | | 2/2001 | |
| WO | 0130079 | A1 | | 4/2001 | |
| WO | 2012036441 | A2 | | 3/2012 | |
| WO | 2017040240 | A1 | | 3/2017 | |
| WO | 2018006946 | A1 | | 1/2018 | |
| WO | 2021172566 | A1 | | 9/2021 | |

OTHER PUBLICATIONS

U.S. Unpublished U.S. Appl. No. 18/301,294, filed Apr. 17, 2023, to Todd Douglas Lenser et al.

U.S. Unpublished U.S. Appl. No. 18/301,300, filed Apr. 17, 2023, to Todd Douglas Lenser et al.

U.S. Unpublished U.S. Appl. No. 18/329,630, filed Jun. 6, 2023, Todd Douglas Lenser et al.

* cited by examiner

Business Use

Initial image
LEADING EDGE 250
PROTRUSIONS 209
RAW IMAGE 340
TRAILING EDGE 252
ARM 251

Area separation
PROTRUSIONS 209
REGION 350
REGION 352
REGION 353
FILTERED IMAGE 343

Individual Sample points
PROTRUSIONS 209
FILTERED IMAGE 342

Protrusion formation area measurements
FILTERED IMAGE 344

SYSTEM AND METHOD FOR QUALITY CONTROL INSPECTION OF UNITARY PROTRUSIONS IN A SUBSTRATE

CROSS REFERENCE TO RELATED APPLICATION

This application claims the benefit of U.S. Provisional Application No. 63/399,838, filed on Aug. 22, 2022, the entire disclosure of which is incorporated herein by reference.

FIELD

The present disclosure relates generally to the field of unitary protrusion formation in substrates and more specifically to quality control inspection of the unitary protrusions.

BACKGROUND

Unitary protrusion formation is employed when forming substrates that are used in manufacturing absorbent articles (e.g., diapers, pants, adult incontinence products), for example, or other products. The unitary protrusions formed in the substrate may be used for various components of the absorbent article (e.g., a landing zone or a fastener) or components of other products.

Defects are common in conventional methods for unitary protrusion formation, such as holes in the substrate, protrusions which are not fully formed, broken protrusions, wrinkles, and absent protrusions. Each of these defects may adversely affect the manufacturing of the absorbent articles, since much of the substrate with these defectively formed protrusions does not meet quality control standards and thus must either be discarded or the absorbent article formed with these defective protrusions are discarded.

The discussion of shortcomings and needs existing in the field prior to the present disclosure is in no way an admission that such shortcomings and needs were recognized by those skilled in the art prior to the present disclosure.

SUMMARY

Various embodiments solve the above-mentioned problems and provide methods and devices useful for quality control inspection of unitary protrusions formed in a substrate. The substrate may be used in absorbent articles, but use of the substrate is not limited to absorbent articles.

Various solutions may include providing a vision inspection system that illuminates a region of the substrate with the unitary protrusions and gathers image data of the illuminated region. The image data may then be processed to inspect whether characteristics of the unitary protrusions in the region of the substrate meet one or more quality control criteria. Additionally, the image data may be processed to inspect whether one or more undesirable features are present in the region of the substrate and if so, whether characteristics of the undesirable features do not comply to one or more quality control criteria.

More specifically, various embodiments relate to a method of forming protrusions in a portion of a substrate. The method may comprise providing a first device comprising an outer surface; providing a second device comprising a source of vibration energy; forming a nip between the source of vibration energy and the outer surface; conveying the substrate through the nip; forming the protrusions in the portion of the substrate in the nip using the source of vibration energy; and inspecting one or more characteristics of the substrate using a vision system.

According to various embodiments, the method may also comprise applying vibration energy to the substrate intermittently or continuously.

According to various embodiments, the method may also comprise imparting thermal energy to the portion of the substrate upstream of the nip to heat the portion of the substrate to a temperature below a melting temperature of the portion of the substrate, where the temperature below the melting temperature of the portion of the substrate is in a range of about 90 degrees C. to about 160 degrees C.

According to various embodiments, the method may also comprise cooling the source of vibrational energy or the first device.

According to various embodiments, the method may also comprise that the second device is a rotary sonotrode, and the vibration energy is ultrasonic energy.

According to various embodiments, the method may also comprise that the second device is a blade sonotrode, and the vibration energy is ultrasonic energy.

These and other features, aspects, and advantages of various embodiments will become better understood with reference to the following description, figures, and claims.

BRIEF DESCRIPTION OF THE DRAWINGS

Many aspects of this disclosure can be better understood with reference to the following figures.

Figure 1A:
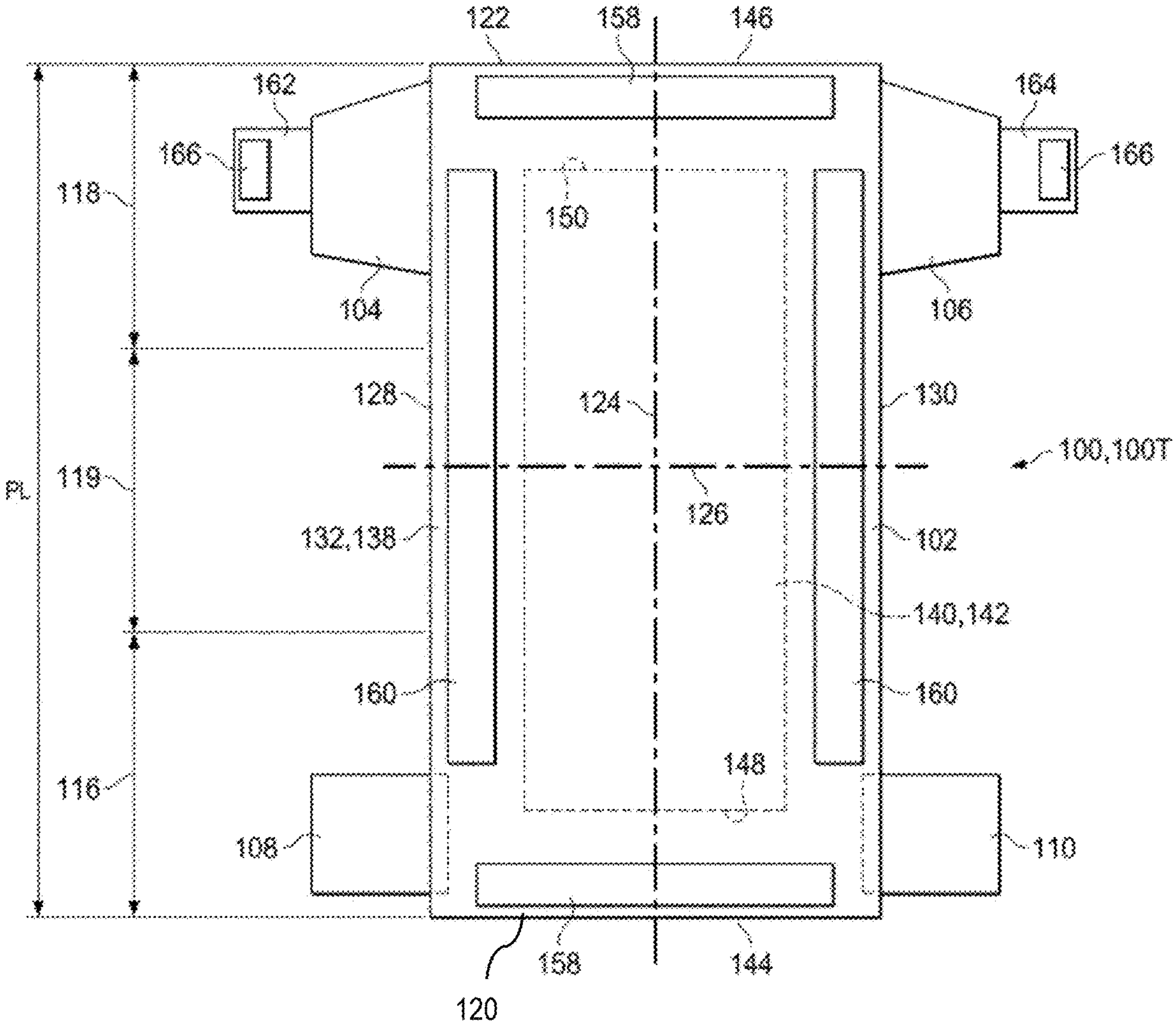
FIG. 1A is a schematic top view illustrating an example of an absorbent article manufactured with substrate having unitary protrusions, according to various embodiments.

It should be understood that the various embodiments are not limited to the examples illustrated in the figures.

DETAILED DESCRIPTION

Introduction and Definitions

This disclosure is written to describe the invention to a person having ordinary skill in the art, who will understand that this disclosure is not limited to the specific examples or embodiments described. The examples and embodiments are single instances of the invention which will make a much larger scope apparent to the person having ordinary skill in the art. Unless defined otherwise, all technical and scientific terms used herein have the same meaning as commonly understood by the person having ordinary skill in the art. It is also to be understood that the terminology used herein is for the purpose of describing examples and embodiments only, and is not intended to be limiting, since the scope of the present disclosure will be limited only by the appended claims.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features. The examples and embodiments described herein are for illustrative purposes only and that various modifications or changes in light thereof will be suggested to the person having ordinary skill in the art and are to be included within the spirit and purview of this application. Many variations and modifications may be made to the embodiments of the disclosure without departing substantially from the spirit and principles of the disclosure. All such modifications and variations are intended to be included herein within the scope of this disclosure. For example, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

All numeric values are herein assumed to be modified by the term "about," whether or not explicitly indicated. The term "about" generally refers to a range of numbers that one of skill in the art would consider equivalent to the recited value (for example, having the same function or result). In many instances, the term "about" may include numbers that are rounded to the nearest significant figure.

In everyday usage, indefinite articles (like "a" or "an") precede countable nouns and noncountable nouns almost never take indefinite articles. It must be noted, therefore, that, as used in this specification and in the claims that follow, the singular forms "a," "an," and "the" include plural referents unless the context clearly dictates otherwise. Thus, for example, reference to "a support" includes a plurality of supports. Particularly when a single countable noun is listed as an element in a claim, this specification will generally use a phrase such as "a single." For example, "a single support."

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

In this specification and in the claims that follow, reference will be made to a number of terms that shall be defined to have the following meanings unless a contrary intention is apparent.

The term "machine direction" (MD) is used herein to refer to the direction of material flow through a process. In addition, relative placement and movement of material can be described as flowing in the machine direction through a process from upstream in the process to downstream in the process.

The term "cross direction" (CD) is used herein to refer to a direction that is generally perpendicular to the machine direction.

General Discussion

To provide an overview, FIGS. 1A-1M, 2A-2D, 3A-3D, 4A-4B, 5A-5B, 6A-6D, 7 and 8 will be referenced generally; individual figures and groups of figures are discussed hereinafter.

An absorbent article will now be discussed, whose manufacture uses a substrate with unitary formed protrusions. The substrate with unitary formed protrusions may also be used in other products, with an absorbent article only being an example. FIG. 1A is a schematic top view illustrating an example of an absorbent article 100 manufactured with substrate having unitary protrusions, according to various embodiments. For purposes of this description, "absorbent article" is not limited to diapers, such as the tapered diaper 100T depicted in FIG. 1A. In particular, FIG. 1A shows a plan view of the diaper 100 with the portion of the diaper that faces toward a wearer oriented towards the viewer. The taped diaper 100T shown in FIG. 1A includes a chassis 102, first and second rear side panels 104 and 106; and first and second front side panels 108 and 110. As shown in FIG. 1A, the diaper 100 and the chassis 102 each include a first waist region 116, a second waist region 118, and a crotch region 119 disposed intermediate the first and second waist regions. The first waist region 116 may be configured as a front waist region, and the second waist region 118 may be configured as back waist region. In some configurations, the length of each of the front waist region, back waist region, and crotch region may be ⅓ of the length of the absorbent article 100. The absorbent article may also include a laterally extending front waist edge 120 in the front waist region 116 and a longitudinally opposing and laterally extending back waist edge 122 in the back waist region 118. To provide a frame of reference for the present discussion, the diaper 100T in FIG. 1A is shown with a longitudinal axis 124 and a lateral axis 126. The longitudinal axis 124 may extend through a midpoint of the front waist edge 120 and through a midpoint of the back waist edge 122. And the lateral axis 126 may extend through a midpoint of a first longitudinal or right side edge 128 and through a midpoint of a second longitudinal or left side edge 130.

As shown in FIG. 1A, the diaper 100 includes an inner, body facing surface 132 and the chassis 102 may include a backsheet (not shown) and a topsheet 138. The chassis 102 may also include an absorbent assembly 140, including an absorbent core 142, disposed between a portion of the topsheet 138 and the backsheet (not shown). As discussed in more detail below, the diaper 100 may also include other features, such as leg elastics and/or leg cuffs, an elastic waist region, and/or flaps, e.g., side panels and/or ears, to enhance the fits around the legs and waist of the wearer, to enhance the fit around the legs of the wearer.

The diaper 100 may also include various configurations of fastening elements to enable fastening of the front waist region 116 and the back waist region 118 together to form a closed waist circumference and leg openings once the diaper is positioned on a wearer. For example, as shown in FIG. 1A, the diaper 100 may include first and second fastening members 162, 164, also referred to as tabs, connected with the first and second rear side panels 104, 106, respectively. The diaper may also include first and second front side panels 108, 110, that may or may not include fastening members. With continued reference to FIG. 1A, each side panel 104, 106 and/or fastening member 162 and 164 may form a portion of or may be permanently bonded, adhered or otherwise joined directly or indirectly to the chassis 102 laterally inward from the side edge 128 and 130, in one of the front waist region 116 or the back waist region 118. Alternatively, the fastening members 162, 164 may form a portion of or may be permanently bonded, adhered or otherwise joined directly or indirectly to the first and second rear panels 104, 106 at or adjacent the distal edge of the panel and/or the first and second front side panels 108 and 110 at or adjacent the distal edge of the side panel. It is to be appreciated that the fastening members and/or side panels may be assembled in various ways, such as disclosed for example, in U.S. Pat. No. 7,371,302. The fastening members 162, 164 and/or side panels 104, 106, 108, 110 may also be permanently bonded or joined at or adjacent the side edges 128 and 130 of the chassis 102 in various ways, such as for example, by adhesive bonds, sonic bonds, pressure bonds, thermal bonds or combinations thereof, such as disclosed for example, U.S. Pat. No. 5,702,551.

Referring now to FIG. 1A, the first fastening member 162 and/or the second fastening member 164 may include various types of releasably engageable fasteners. The first and second fastening members 162 and/or 164 may also include various types of refastenable fastening structures. For example, the first and second fastening members 162 and 164 may include mechanical fasteners, 166, in the form of hook and loop fasteners, hook and hook fasteners, macrofasteners, buttons, snaps, tab and slot fasteners, tape fasteners, adhesive fasteners, cohesive fasteners, magnetic fasteners, hermaphroditic fasteners, and the like. Some examples of fastening systems and/or fastening members 162, 164 are discussed in U.S. Pat. Nos. 3,848,594; 4,662,875; 4,846,815; 4,894,060; 4,946,527; 5,151,092; 5,221,274; 6,251,097; 6,669,618; 6,432,098; and U.S. Patent Publication Nos. 2007/0078427 A1 and 2007/0093769 A1. Additionally, another example of a fastening system includes a Back Ear design (uBER), as discussed in U.S. Pat. No. 9,533,067.

Figure 1B:
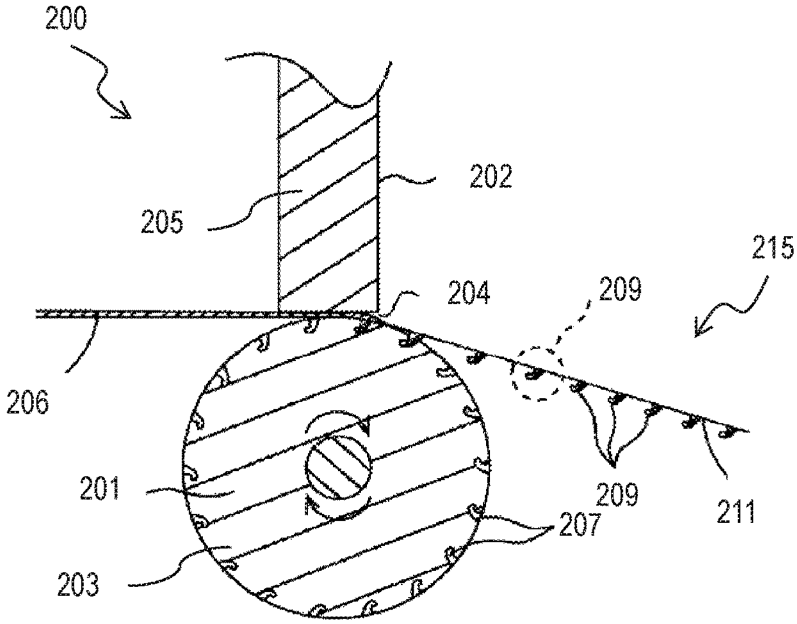
FIG. 1B is a schematic cross-sectional side view illustrating an example of an ultrasonic forming apparatus used to form unitary protrusions in a substrate, according to various embodiments.

Apparatuses are now discussed, which are used to form a substrate used to make one or more components of the absorbent article 100 (e.g. fasteners 166, secondary fastening, disposal tapes, primary fastening, hybrid (diaper with reusable outer cover and disposable insert). FIG. 1B is a schematic cross-sectional side view illustrating an example of an ultrasonic forming apparatus 200 used to form unitary protrusions 209 in a portion or patch 215 of a substrate 211, according to various embodiments. As shown in FIG. 1B, the apparatus 200 may include a first device 201 and a second device 202 with a nip 204 formed therebetween. The first device 201 may be an anvil roll comprising multiple hook-shaped or otherwise shaped cavities or recesses 207, along an outer periphery thereof. In one embodiment, the recesses 207 have a shape configured to produce the protrusions 209 which are suitable for use in a touch fastener of the absorbent article (e.g., fasteners 166). The second device 202 may be a source of vibrational energy 205, such as a blade sonotrode or a vibrating ultrasonic horn. The source of vibration energy 205 applies vibration energy to the substrate 211 intermittently or continuously.

A substrate 206 may be positioned or passed through the nip 204. The substrate 206 may be, but need not be limited to, a film, sheet, web, nonwoven, composite, laminate, or other form, or may be portions of a film, sheet, web, nonwoven, laminate or substrate thermoplastic material, portions of which may be used as a component of a touch fastener, for instance on an absorbent article. In their use on absorbent article, touch fasteners may be attached to a "side tab" or "ear" that the consumer uses to secure the absorbent article the wearer. These tabs may be constructed with a piece of extensible material to allow the side tab to stretch and flex when attached or when the wearer moves. The touch fasteners may also be used in a two-point fastening system on an absorbent article, where the component is positioned on a landing zone or outer cover of the absorbent article. The present disclosure further contemplates the use of preformed film, sheet, web, composite, laminate, etc. as a substrate material.

During operation, the second device 202 is positioned in close proximity to an outer surface 203 of the rotating first device 201 and in contact with the substrate 206 being processed. The first device 201 may also be a flat plate in other forms with the substrate moving over the flat plate. The second device 202 may be vibrated at frequencies between about 50 Hz to about 50 kHz, as required. A portion of the substrate 206 in contact with, or in proximity with, the first device 201 and second device 202 may be softened by the vibration energy from the second device 202 and a desired portion of the substrate 206 may enter into the cavities 207 of the first device 201 to be shaped into projections 209 on the front surface of the film or sheet 211 as the first device 201 rotates in the direction indicated in FIG. 1B by the arrows. This process may be referred to as rotary forming. Force may be exerted on the substrate 206 as it passes through the nip 204 to apply a requisite amount of pressure to the softened substrate 206 to assist its entry and filling of at least some of, or all of, the cavities 207. One example of the process is described in U.S. Pat. No. 8,784,722.

In some embodiments, heat energy is imparted to the portion or patch 215 of the substrate 211 upstream of the nip 204 to heat the patch 215 of the substrate 211 to a temperature below a melting temperature of the patch 215 of the substrate 211, where the temperature below the melting temperature of the portion of the patch 215 is in a range of about 90 degrees C. to about 160 degrees C.

In various embodiments, the apparatus 200 includes a means of cooling the source of vibrational energy 205 or the first device 201.

Figure 1C:
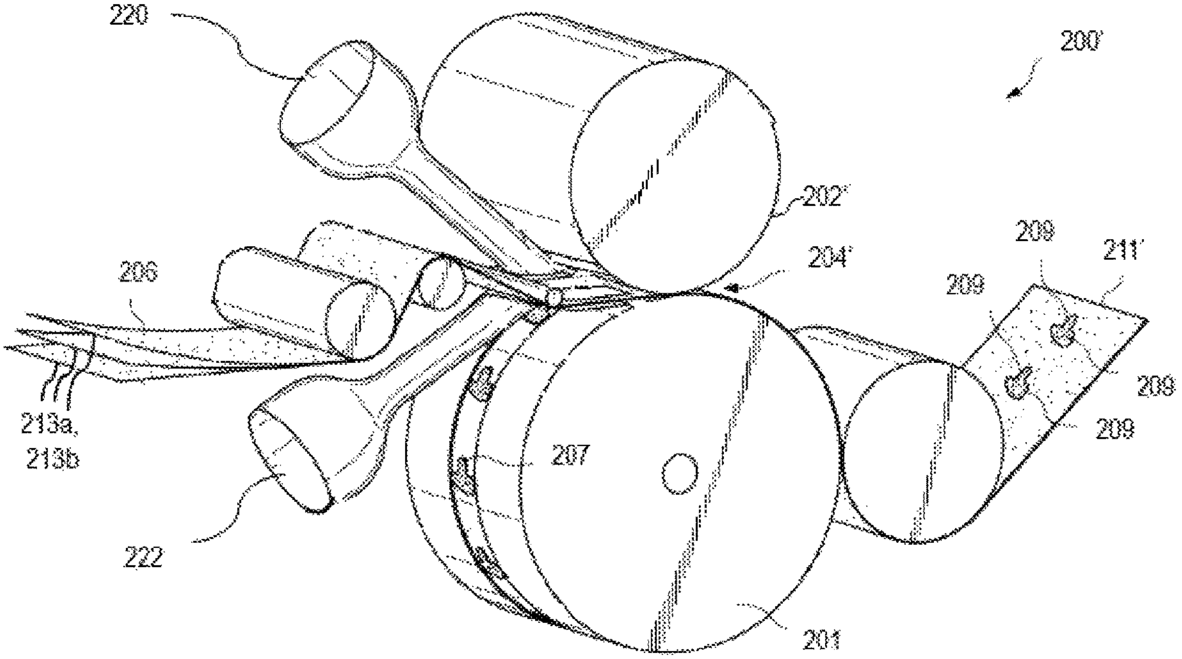
FIG. 1C is a schematic perspective side view illustrating an example of an ultrasonic forming apparatus used to form unitary protrusions in a substrate, according to various embodiments.

Although the embodiment of FIG. 1B depicts a blade sonotrode as the second device 202 in other embodiments different sonotrodes can be used as the second device. FIG. 1C is a schematic perspective side view illustrating an example of an ultrasonic forming apparatus 200' used to form unitary protrusions 209 in a substrate 211, according to various embodiments. The apparatus 200' includes similar components as the apparatus 200, with the exception of the features discussed herein. Unlike the apparatus 200 of FIG. 1B which features a blade sonotrode as the second device 202, the apparatus 200' of FIG. 1C features a rotary sonotrode as the second device 202' that is the source of ultrasonic energy. In various embodiments, FIG. 1C further depicts that the substrate 211 may include more than one layer 213*a*, 213*b* or more than one type of material. Additionally, the apparatus 200' may feature one or more substrate pre-heaters 220, 222 which may impart thermal energy to the substrate prior to the application of vibrational energy. The thermal energy may reduce the quantity of vibrational energy and/or time required to form a protrusion.

Figure 1D:
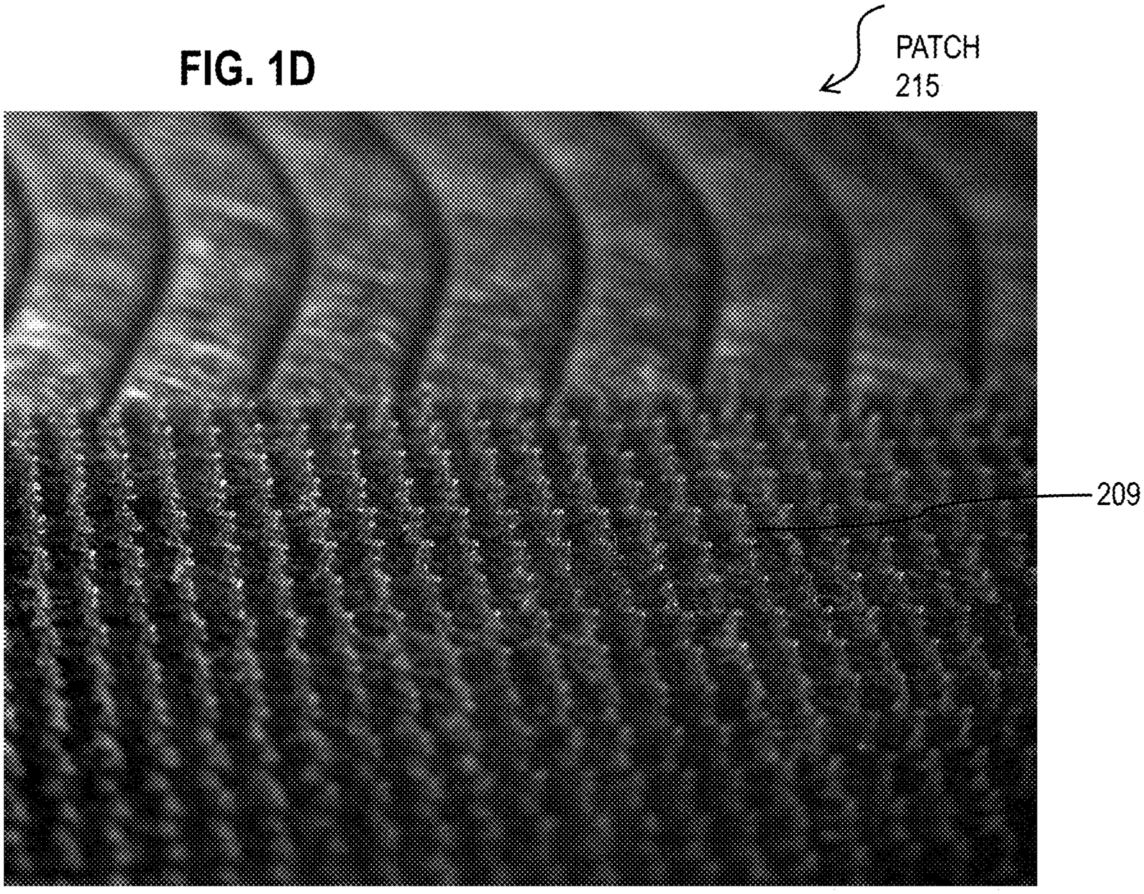
FIG. 1D is a top perspective view illustrating an example of a region of unitary formed protrusions in a substrate using the apparatus of FIG. 1B or 1C, according to various embodiments.
Figure 1E:
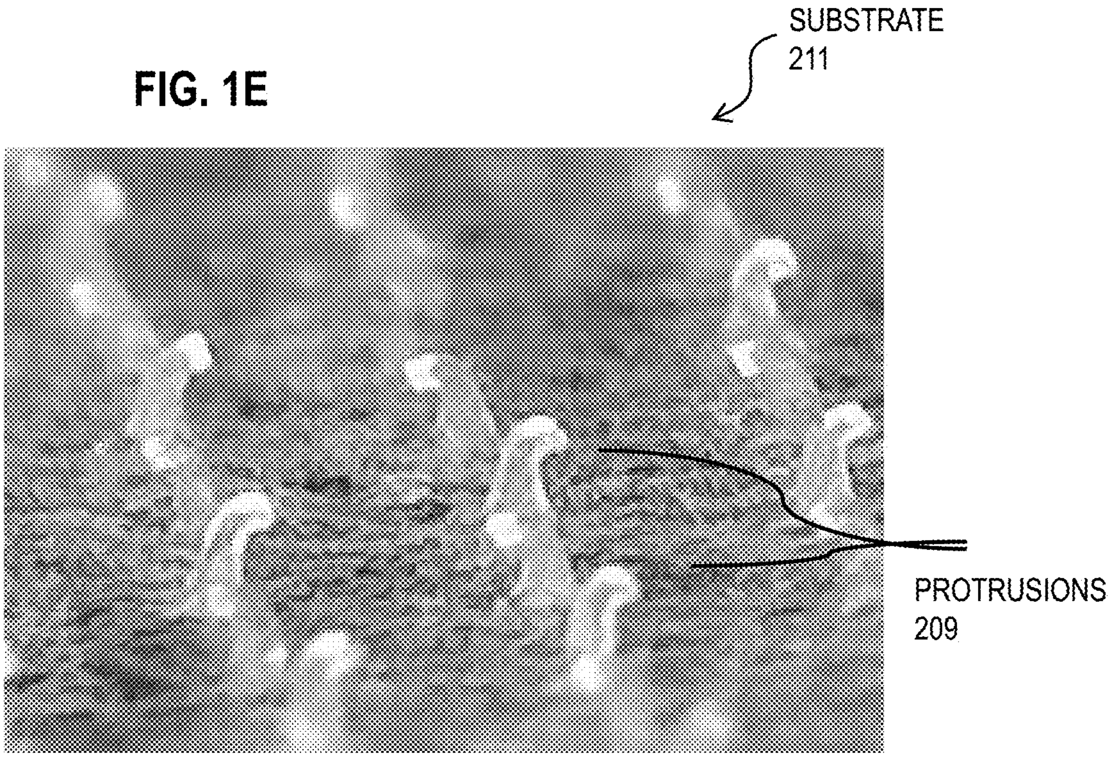
FIG. 1E is a side perspective view illustrating an example of unitary formed protrusions in a substrate using the apparatus of FIG. 1B or 1C, according to various embodiments.
Figure 1F:
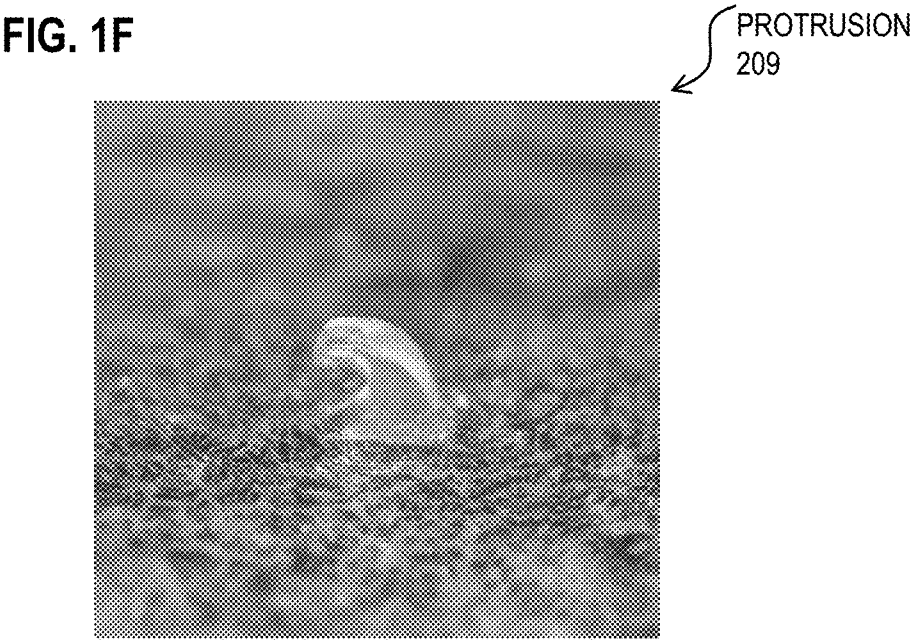
FIG. 1F is a side perspective view illustrating an example of a single unitary formed protrusion in a substrate using the apparatus of FIG. 1B or 1C, according to various embodiments.

The patch 215 of the protrusions 209 formed by the apparatuses 200, 200' of FIGS. 1B and 1C will now be discussed. FIG. 1D is a top perspective view illustrating an example of a patch 215 of unitary formed protrusions 209 in a substrate using the apparatus 200, 200' of FIG. 1B or 1C, according to various embodiments. FIG. 1E is a side perspective view illustrating an example of unitary formed protrusions 209 in a substrate 211 using the apparatus 200, 200' of FIG. 1B or 1C, according to various embodiments. In an embodiment, the view depicted in FIG. 1E is a side view along the CD and the protrusions 209 are oriented along the MD. In other embodiments, a side view such as depicted in FIG. 1E is captured along the MD for protrusions 209 oriented along the CD. The inventors of the present invention recognized that in some embodiments, a side view image of the protrusion 209 is used to measure values of one or more parameters of the protrusion 209, as discussed later with respect to FIG. 1G. FIG. 1F is a side perspective view illustrating an example of a single unitary formed protrusion 209 in a substrate 211 using the apparatus 200, 200' of FIG. 1B or 1C, according to various embodiments. In various embodiments, the images depicted in FIGS. 1D, 1E, and/or 1F are generated by a camera and are used by the vision inspection system disclosed herein to perform a quality control assessment of the unitary formed protrusions 209.

Figure 1G:
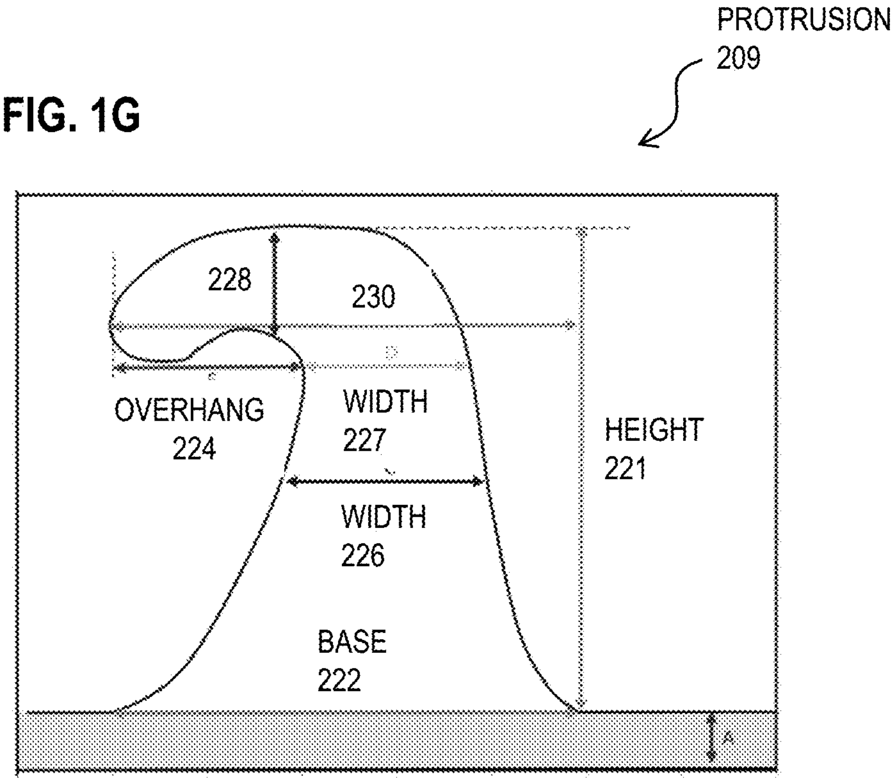
FIG. 1G is a schematic side view illustrating an example of one or more dimensional parameters of a single unitary formed protrusion in a substrate using the apparatus of FIG. 1B or 1C, according to various embodiments.

Additionally, various embodiments involve inspection of individual protrusions and whether the individual protrusions meet different quality control criteria. FIG. 1G is a schematic side view illustrating an example of one or more dimensional parameters of a single unitary formed protrusion 209 in a substrate 211 using the apparatus 200, 200' of FIG. 1B or 1C, according to various embodiments. A height parameter 221 indicates a height of the protrusion 209 from the substrate 211 (measured in a direction orthogonal to the surface of the substrate 211). A base parameter 222 indicates a length of a juncture between a base of the protrusion 209 and the substrate 211. An overhang 224 parameter indicates a length of an overhang portion of the protrusion 209. A width 226 parameter indicates a width of the protrusion 209 at a certain fixed height (e.g. half of a peak height) of the protrusion 209. A width 227 parameter indicates a minimum width of the protrusion 209. A hook tip thickness parameter 228 indicates a maximum thickness of the tip of the protrusion 209. A length parameter 230 indicates a length of the protrusion 209 along the substrate. Although FIG. 1G depicts multiple dimensional parameters of the protrusion 209 that can be used to perform a quality control assessment of the protrusions 209, other dimensional parameters not depicted can be utilized in the assessment. In various embodiments, the protrusions 209 comprise hooks for use on a disposable absorbent article (e.g. diaper 100), and a characteristic of the protrusion 209 that is assessed by the quality control system discussed herein is whether the hooks were properly formed.

Figure 1H:
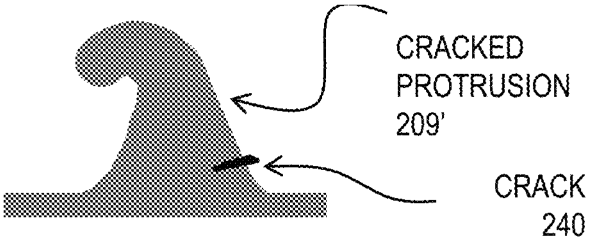
FIGS. 1H through 1L are side views illustrating an example of one or more defective protrusions formed in a substrate using the apparatus of FIG. 1B or 1C, according to various embodiments.
Figure 1I:
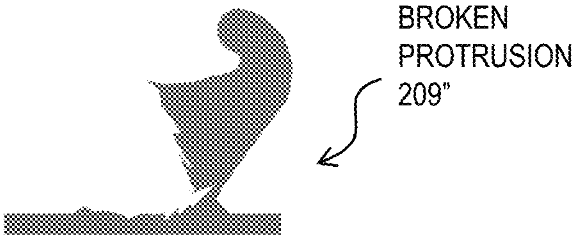
Figure 1J:
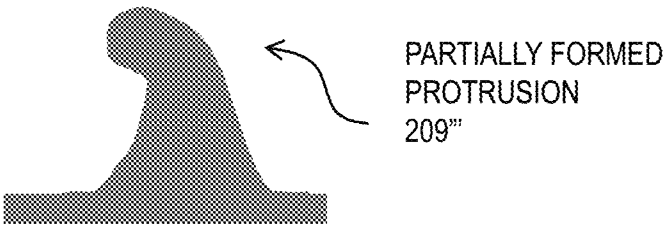
Figure 1K:
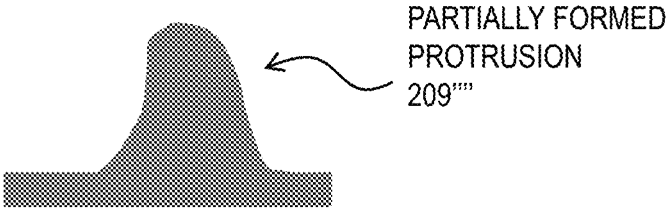
Figure 1L:
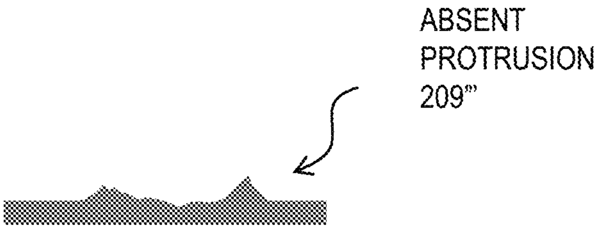
Figure 1M:
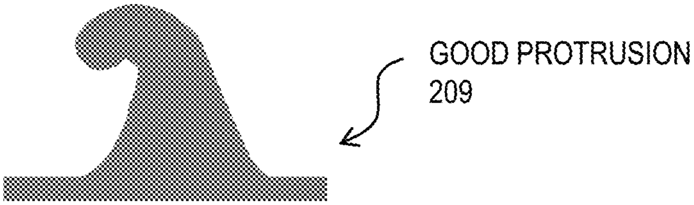
FIG. 1M is a side view illustrating an example of a good protrusion formed in a substrate using the apparatus of FIG. 1B or 1C, according to various embodiments.

One or more examples of defective deformations are now discussed, which the vision inspection system disclosed herein will be utilized to detect during inspection of the substrate. FIGS. 1H through 1L are side views illustrating an example of one or more defective protrusions 209', 209", 209'" formed in a substrate 211 using the apparatus 200, 200' of FIG. 1B or 1C, according to various embodiments. In various embodiments, defective protrusions may comprise partially formed protrusions, partially formed protrusions with partially formed overhangs, missing/absent hook sites, partially broken protrusions, and/or cracked protrusions. In various embodiments, the defective protrusions include a cracked protrusion 209' as depicted in FIG. 1H, which includes a crack 240 formed adjacent a juncture between a base of the protrusion 209' and the substrate. In various embodiments, the defective protrusion includes a broken protrusion 209" as depicted in FIG. 1I, which is wholly or substantially severed from the substrate 211. In various embodiments, the defective protrusion also includes an absent protrusion 209'" as depicted in FIG. 1L, where the protrusion is not positioned at a desired or expected location in the patch 215. In various embodiments, the defective protrusion includes a partially formed protrusions 209"" as depicted in FIG. 1J and/or partially formed protrusion 209'"" as depicted in FIG. 1K. In various embodiments, the system may identify a desired shape of a good protrusion as depicted in FIG. 1M.

Although defective protrusions are discussed herein for inspection by the vision inspection system, the inspection system can detect multiple defects of the substrate beyond the defective protrusions. In various embodiments, these defects include but are not limited to incompletely formed patches, missing patches, holes in the substrate, foldovers, wrinkles, mistracks, CD tracking errors, MD position errors relative to another machine element, product graphic, or product component, contamination, burn-thru intermediate patches, improperly formed hook geometry, splices, startup/shutdown scrap.

Figure 2A:
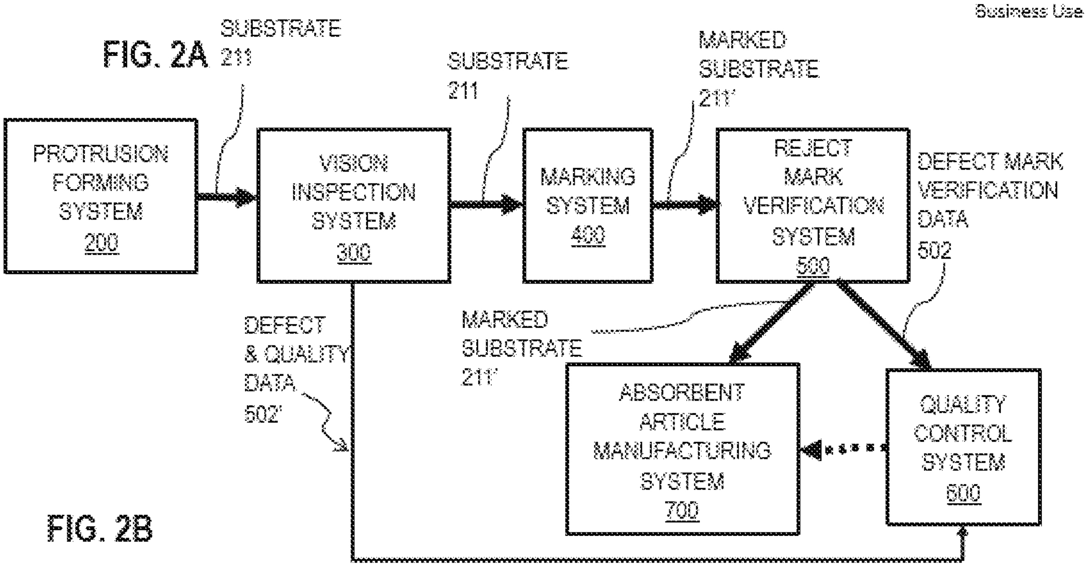
FIG. 2A is a block diagram illustrating an example of different systems involved in the unitary formation of protrusions in a substrate, quality inspection of the protrusions and manufacturing of an absorbent article with the substrate, according to various embodiments.

In various embodiments, multiple systems may be employed to perform inspections at different stages of a process that includes unitary formation of the protrusions in a substrate, inspection of the unitary formed protrusions in the substrate, marking the substrate based on detection of one or more defects in the unitary formed protrusions and using the inspected unitary formed protrusions to manufacture an absorbent article. These systems are depicted in FIG. 2A and will now be discussed herein. FIG. 2A is a block diagram illustrating an example of different systems involved in the unitary formation of protrusions 209 in a substrate 211, quality control inspection of the protrusions 209 and manufacturing of an absorbent article 100 with the substrate, according to various embodiments.

The protrusion forming system 200 of FIG. 2A forms the substrate 211, which is then passed to the vision inspection system 300 which performs a quality control inspection of the substrate 211 and the unitary formed protrusions 209. The output of this inspection is defect and/or quality data 502', which may comprise attribute measurements that may include positive attributes (e.g., variable measurements including discrete good/bad measurements), variables (e.g., continuous parameters), images, code dates, and/or defect codes. Thus, in various embodiments, the vision inspection system 300 is positioned downstream of the protrusion forming system 200 and nip 204. If one or more defects is detected during this quality control inspection, a marking system 400 is provided that generates one or more marks on a marked substrate 211' to convey information about the detected defect. A reject mark verification system 500 may optionally be provided to verify the one or more generated marks on the marked substrate 211', may stop the process in event of an error, and/or may convey reject mark verification data 502 to a quality control system 600. The quality control system 600 can perform an assessment of the Defect and Quality data 502' and/or Defect Mark Verification Data 502 for purposes of tracking quality control of the generated substrate 211. In various embodiments, the quality control system 600 can convey the defect and quality data 502' and/or the defect mark verification data 502 to an absorbent article manufacturing system 700 that is used to remove marked substrate 211' when manufacturing the absorbent articles 100 (or removing manufactured absorbent articles 100 formed with the marked substrate 211').

In various embodiments, when rotary formation of the unitary formed protrusions 209, 209' in the substrate 211 occurs on the apparatus 200, 200' of FIG. 1B or 1C and the substrate 211 is subsequently used to manufacture the absorbent article 100 in a subsequent absorbent article manufacturing system 700, a method of managing quality of the finished article is desirable. In some embodiments, this method of managing quality of the finished article can be performed on one or more intermediate devices such as the vision inspection system 300, the marking system 400, the reject mark verification system 500 and the quality control system 600. In various embodiments, this method may include inspection, defect tracking, defect marking, culling of defects at a first machine, a second machine, or a rework station. The performance metrics measured by such a system may be utilized for scrapping decisions, contractual terms, operations planning, and process qualification.

In various embodiments, the marking system 400 may be used to mark defects on the substrate 211 by methods which may include printing a mark, applying a flag material, forming a hole, mark, or protrusions on the substrate 211 in a positional relationship to the defect. A printed mark may be in a visible spectrum or outside a visible spectrum, such as a mark printed with a UV ink. In some embodiments, the marked defects may be removed from the substrate 211 at a rework station.

In various embodiments, rolls or aggregate forms of raw material delivery containing high levels of defects may be scrapped before delivery to the absorbent article manufacturing system 700, which may include a diaper converter. Defect levels may be used for operational interventions or contractual requirements. Marked defects may be selectively culled from the output of the absorbent article manufacturing system 700, such as via the individual pad reject system of a diaper converter.

In various embodiments, the reject mark verification system 500 is used for detection of the defect modes of interest or detection of a proxy, which may include a printed graphic, a formed hole, a formed protrusion, an added substrate, a laser etched marked, or other forms of marking. In various embodiments, the proxy mark may also comprise encoded data such as in a QR code capturing descriptive information about the local defect (type, size, quantity), or providing instructions to a control system about quantity and offset of products to reject when detected.

Figure 2B:
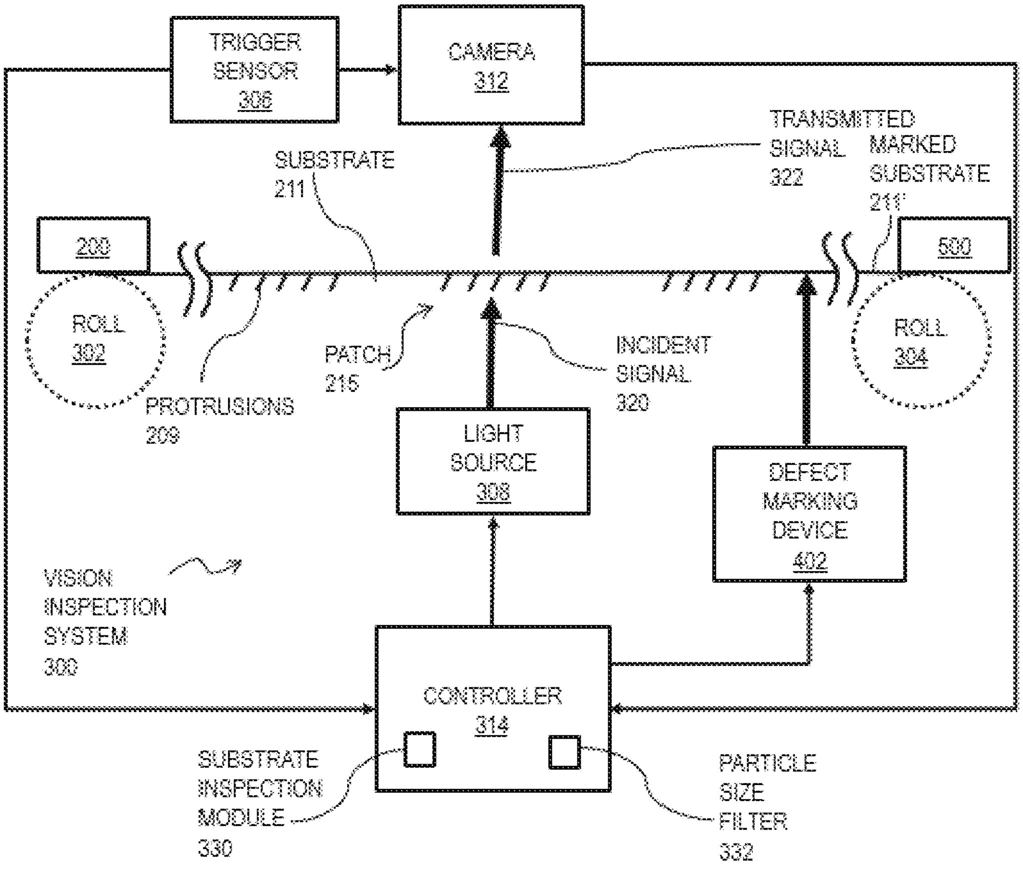
FIGS. 2B through 2D are block diagrams illustrating an example of a vision inspection system to perform a quality control inspection of unitary formed protrusions in a substrate, according to various embodiments.
Figure 2C:
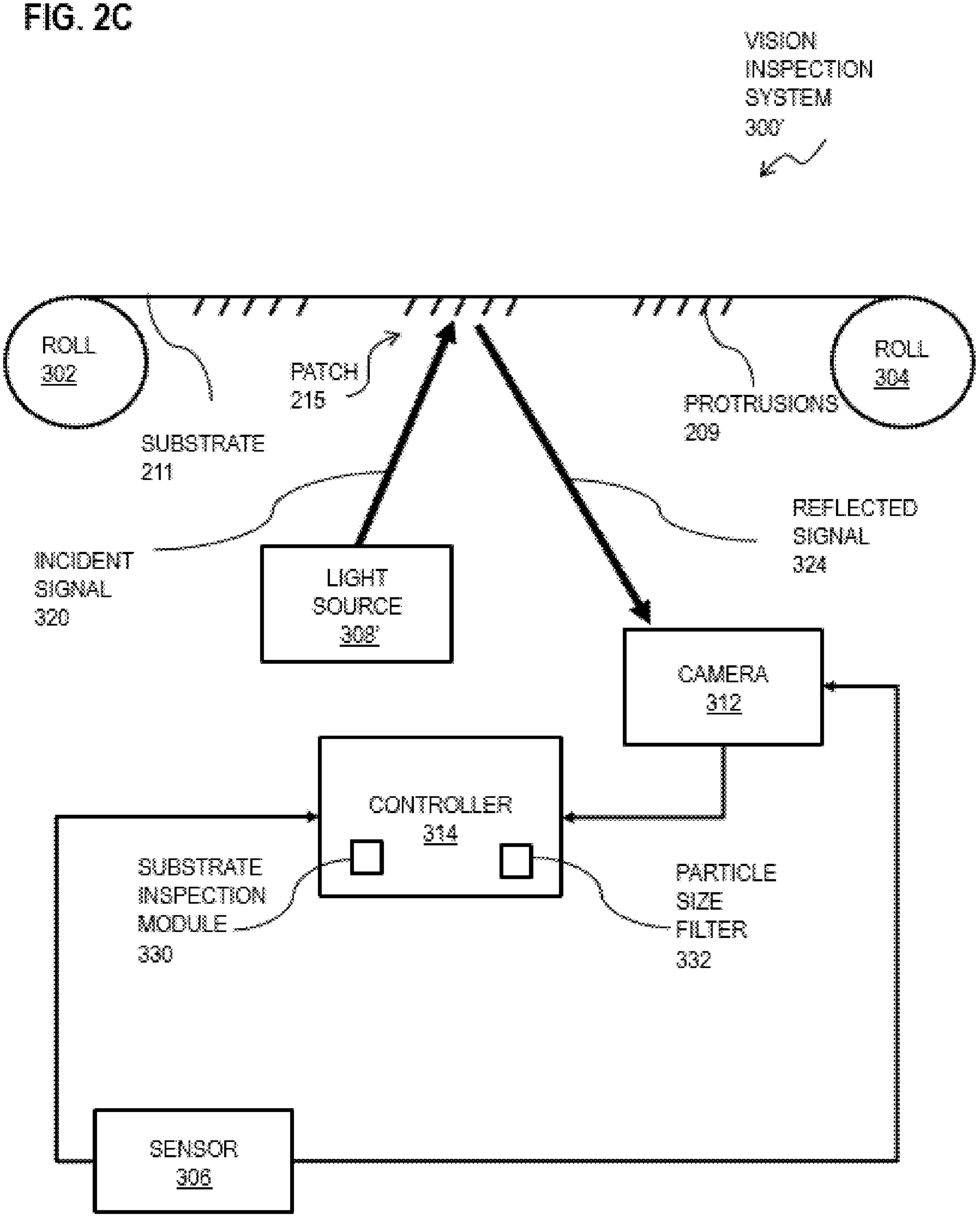
Figure 2D:
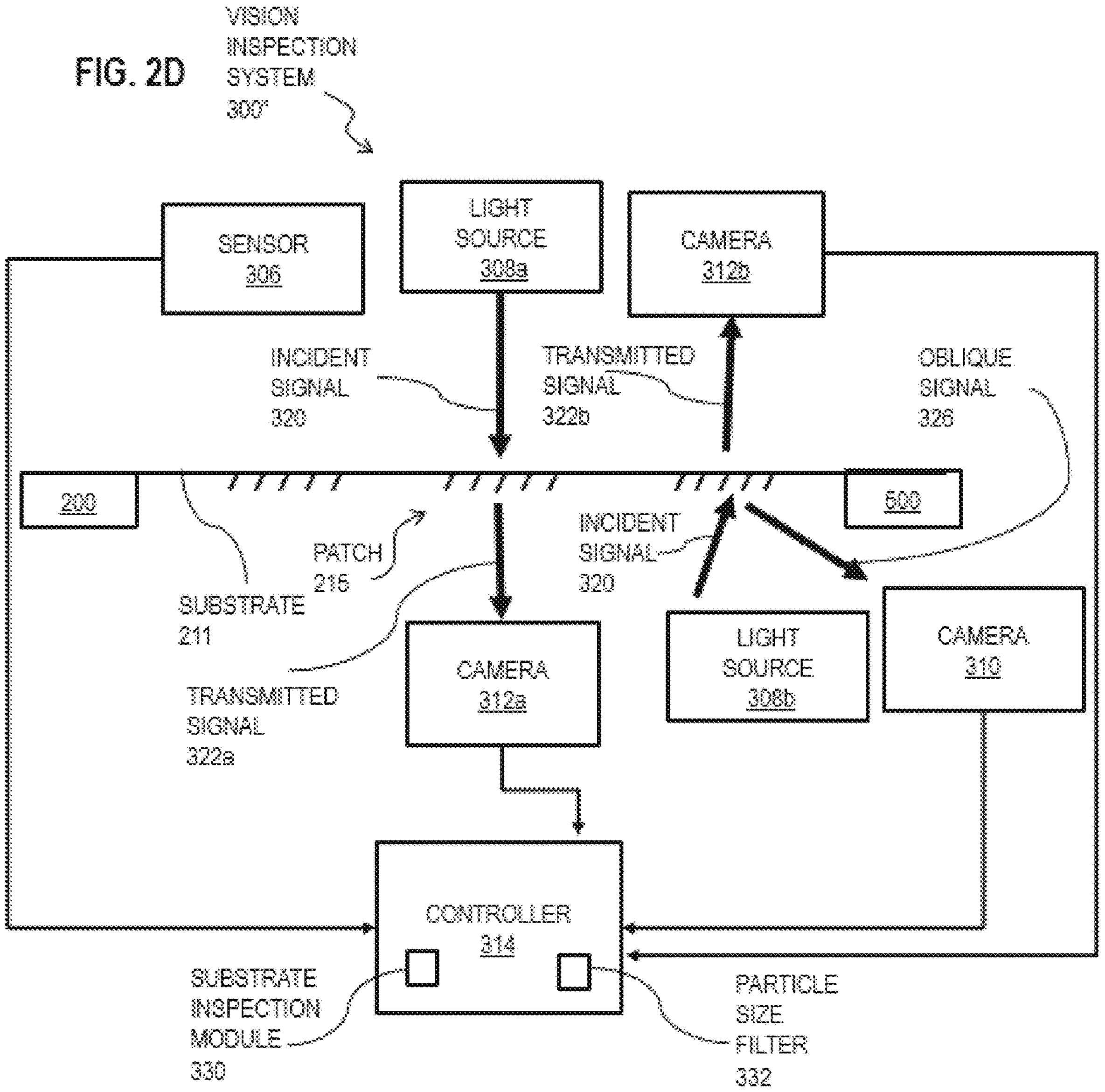

Various embodiments of the vision inspection system 300 will now be discussed. FIGS. 2B through 2D are block diagrams illustrating an example of a vision inspection system 300, 300', 300" to perform a quality control inspection of unitary formed protrusions 209 in a substrate 211, according to various embodiments. In various embodiments, the vision inspection system 300 is used to inspect one or more characteristics of the substrate 211. In some embodiments, the vision inspection system 300 inspects a positive aspect of the substrate 211, e.g., the characteristic of a number of protrusions 209 in the patch 215 of the substrate. In other embodiments, the vision inspection system 300 inspects a negative aspect of the substrate 211, e.g., the characteristic of a number of holes or size of hole(s) in the patch 215 of the substrate. In one example embodiment, the inspection system 300 measures a size of a predetermined quantity (e.g. five) of the largest holes detected in each path 215 of the substrate.

In various embodiments, application of the vision inspection system 300 to inspect key metrics of every patch 215 or a sampled subset of patches 215 serves to identify defects of the unitary formed protrusions 209. The vision inspection system 300 may comprise a line scan system after rotary formation.

As shown in FIG. 2B, in some embodiments the vision inspection system 300 inspects the substrate 211 generated by the protrusion forming system 200 which is formed on a roll 302. For example, said vision inspection system 300 may be utilized on a rework line or on an absorbent article manufacturing system to inspect and mark defective where appropriate on a substrate roll with previously formed protrusions. In this embodiment, the vision inspection system 300 need not be positioned downstream of the protrusion forming system 200 and instead can be positioned at different locations. However, in other embodiments the vision inspection system 300 is configured to inspect substrate 211 after being generated by the protrusion forming system 200, in which case the vision inspection system 300 is located downstream of the protrusion forming system 200.

In various embodiments, the vision inspection system 300 includes a light source 308 positioned on one side of the substrate 211 and a camera 312 positioned on an opposite side of the substrate 211. In this embodiment, the vision inspection system 300 features a backlit arrangement between the light source 308, substrate 211 and camera 312. In other embodiments a front lit arrangement is also provided where the light source and camera are located on a same side of the substrate 211. The vision inspection system 300 may use one or multiple cameras. Cameras may be on a first side of the substrate with protrusions, or on a second side of a substrate without protrusions. In some embodiments, cameras may be utilized on both a first and second side of the substrate. In some embodiments, the light source may be utilized on both a first and second side. In some embodiments, the one or more cameras may be oriented orthogonal to a substrate or at an angle (e.g. non-orthogonal angle). In still other embodiments, the light source(s) may be oriented orthogonal to a substrate or at an angle (e.g. non-orthogonal angle). In one embodiment, the angles at which the camera(s) and/or light source(s) are oriented may be inclined relative to the machine direction (MD), the cross machine direction (CD), or an angle between the MD and the CD. In one example embodiment, the camera 312 is a 4 k Linescan camera (Basler®, Model raL4096) with a certain lens (Schneider® Xenon-E 2.8/28S—28 mm focal length). In another embodiment, the setup of the camera 312 allows a high resolution over a small field of view (e.g., 36 pixels/mm resolution).

In various embodiments, a trigger sensor 306 detects when a patch 215 of the unitary formed protrusions 209 in the substrate 211 reaches a position to be illuminated by the light source 308 and transmits a signal to a controller 314. In these embodiments, the camera 312 captures a transmitted signal 322 to generate an image. In these embodiments, the light source 308 illuminates each patch 215 of protrusions with an incident signal 320 that remains on during operation of the system 300. Thus, in these embodiments, the light source 308 need not be signaled by the controller 304 to illuminate each detected patch 215. In other embodiments, the controller 314 also transmits a signal to the light source 308 to illuminate the patch 215 of protrusions with an incident signal 320. In other embodiments, the trigger sensor 306 does not detect a position of the patch 215 to be illuminated by the light source 308 and instead a trigger signal electrically stimulates the camera 312 to capture the transmitted signal 322 and image data. In these embodiments, the trigger signal (e.g. generated by a high speed output card or an internal signal generated by the controller 314) to the camera 312 initiates the capture of the transmitted signal 322 and the image. In these embodiments, the trigger sensor 306 transmits a regular signal to the camera 312 based on a timing or phase position of the substrate 211 (e.g. such that a patch 215 is positioned to be illuminated by the incident signal 320 each instance that the sensor 306 transmits the signal to the camera 312). In an example embodiment, the trigger signal may be generated by one or more of a retro-reflective, through beam, or proximity reflective, or color optical sensor relative to the substrate 211. In various embodiments, the trigger signal from the sensor 306 may be via a high speed output card connected electronically to the servo motor of the mold roll or other suitable servo axis. The trigger signal may be initiated by a discrete sensor, such as an inductive or capacitive proximity sensor, relative to a flag on the mold roll. The trigger signal may be generated by an output cam command in a programmable logic controller. In other embodiments, the inspection may occur on a periodic time basis.

In various embodiments, a controller 314 is provided and is communicatively coupled to the camera 312 to receive image data from the camera 312 based on the transmitted signal 322. The controller 314 includes a module 330 and a particle size filter 332 to perform a quality control inspection of the substrate 211. In some embodiments, the controller 314 is configured to process the image data received from the camera 312 and perform one or more steps to inspect whether the patch 215 of protrusions 209 comply with one or more quality control criteria. In an embodiment, the module 330 and particle size filter 332 includes or more sequences of instructions to cause the controller 314 to perform one or more steps of the methods 800, 830, 850, 870 discussed with respect to one or more of the flowcharts of FIGS. 6A through 6D. In some embodiments, the processor or controller 314 is a computer system as described below with reference to FIG. 7 or a chip set described below with reference to FIG. 8.

In various embodiments, the controller 314 processes the image data received from the camera 312 and determines whether or not the patch 215 of protrusions 209 features one or more defects. In these embodiments, if the controller 314 determines that the patch 215 of protrusions 209 features one or more defects, the controller 314 transmits a signal to a defect marking device 402 (e.g. inkjet printer, QR code marking device, laser code dater, etc.) to mark the substrate 211' with a marking that indicates the defect. In some embodiments, the marking imposed by the defect marking device 402 just indicates whether or not the patch 215 of protrusions 209 has a defect. In other embodiments, the defect marking device 402 imposes a marking (e.g. QR code, barcode, or alphanumeric code) which conveys information with respect to the specific defect (e.g. the location of the defect, the type of defect, an identification of the one or more patches 215 with defects, etc.). In some embodiments, upon determining that the patch 215 features one or more defects, the controller 314 is configured to transmit a signal to a display (e.g. display 914 in FIG. 7) to output information pertaining to the determined effect.

As shown in FIG. 2B, after the defect marking device 402 imposes the mark on the defective substrate 211', the marked substrate 211' passes to either the absorbent article manufacturing system 700 or is placed on a roll 304. In some embodiments, as shown in FIG. 2A before the substrate 211' passes to the absorbent article manufacturing system 700, it may pass through the reject mark verification system 500. In other embodiments, where the marked substrate 211' is placed on a roll 304, the roll 304 may be subsequently transported to a location where the absorbent article manufacturing system 700 is located. Thus, in these embodiments, the vision inspection system 300 and absorbent article manufacturing system 700 need not be downstream of each other in the same location. Said differently, the vision inspection by the vision inspection system 300 may occur on a rotary formation line, on a rework line, or on a diaper converting line. Where the vision inspection occurs before an absorbent article manufacturing line, reject marking may be utilized. Where reject marking is utilized, a reject mark verification system 500 may be utilized to reduce the risk of defective product reaching consumers.

In various embodiments, FIG. 2C shows an example of a vision inspection system 300' that is similar to the vision inspection system 300' of FIG. 2B with the exception of the features discussed herein. Unlike the vision inspection system 300 of FIG. 2B which is a backlit system (light source and camera located on opposite sides of the substrate 211), the vision inspection system 300' of FIG. 2C is a front lit system where the light source 308' and the camera 312 are located on a same side of the substrate 211. The camera and light source may be on the protrusion side of the substrate (e.g. a side of the substrate 211 with the protrusions 209) or an opposite side of the substrate from the protrusion side. Although FIG. 2C does not depict the protrusion forming system 200 and absorbent article manufacturing system 700 as optional systems shown in FIG. 2B, these systems 200, 700 are also optional in the vision inspection system 300'. Thus, in some embodiments, the substrate 211 comes from the protrusion forming system 200 that is upstream from the vision inspection system 300 and the marked substrate 211' is passed to the absorbent article manufacturing system 700 that is downstream of the vision inspection system 300'. In other embodiments, the substrate 211 comes from the roll 302 that is upstream of the vision inspection system 300 and passes to the roll 304 that is downstream of the vision inspection system 300'.

As shown in FIG. 2C, in the front lit vision inspection system 300' the light source 308' generates the incident signal 302 to illuminate the patch 215 of unitary formed protrusions 209. In various embodiments, the camera 312 receives a reflected signal 324 from the patch 215 of protrusions 209 and transmits image data to the controller 314 based on the reflected signal 324. As with the vision inspection system 300, the controller 314 of the vision inspection system 300' is used to perform one or more steps to process the image data and determine whether the patch 215 of protrusions 209 in the image data has one or more quality control defects. Although the defect marking device 402 is not depicted in FIG. 2C, the controller 314 in FIG. 2C can transmit a signal to the defect marking device 402 to mark one or more defects on the substrate 211'.

In various embodiments, FIG. 2D shows an example of a vision inspection system 300" that is similar to the vision inspection systems 300, 300' of FIGS. 2B and 2C with the exception of the features discussed herein. Unlike the vision inspection systems 300, 300' of FIGS. 2B and 2C where a single light source and camera are employed to inspect one patch 215 of protrusions 209, the vision inspection system 300" of FIG. 2D features multiple light sources **308*a*, 308*b* and multiple cameras 312*a*, 312*b* to simultaneously inspect multiple patches 215 of protrusions 209. Although FIG. 2D depicts two light sources 308*a*, 308*b* and three cameras 312*a*, 312*b*, 310 the embodiments are not limited to this arrangement and may include more than two light sources and more or less than three cameras that are used to simultaneously inspect more than two patches 215 of protrusions 209. Additionally, although FIG. 2D depicts that the multiple light sources 308*a*, 308*b* and multiple cameras 312*a*, 312*b*, 310 are used to inspect patches 215 along a same lane, in other embodiments the light sources 308*a*, 308*b* and cameras 312*a*, 312*b*, 310 may be used to simultaneously inspect patches 215 of protrusions 209 arranged in different lanes. Multiple cameras 312*a*, 312*b*, 310 in one or more lanes may communicate with one or more controllers 314. For purposes of this description, "lane" refers to a respective substrate 211 with protrusions 209 that move in the MD or a group of substrates 211 with protrusions 209 that move in the MD. Thus, multiple lanes of substrate 211/protrusions 209 are arranged in the CD where each lane of substrate 211/protrusion 209 moves in the MD. One of more of cameras 312*a*, 312*b*, 310 may move positions to inspect one or more lanes at different times (e.g. the cameras 312*a*, 312*b*, 310 may move between different lanes at different times to perform the vision inspection of multiple lanes at different times). In one example embodiment, multiple lanes (e.g. five) are provided in the CD with a group of multiple substrates 211/protrusions 209 in the CD of each lane (e.g. two) and multiple cameras (e.g. two or three) to inspect the substrate 211/protrusions 209 within each lane that communicate with one or more controllers 314. In an example embodiment, five lanes are provided in the CD with a group of ten substrates 211/protrusions 209 in the CD (e.g. a group of two substrates 211/protrusion 209 in the CD of each lane) and between about 10 and 20 cameras to perform the vision inspection of each substrate 211/protrusions 209**.

In various embodiments, unlike the vision inspection systems 300, 300' of FIGS. 2B and 2C where the light source 308 and camera 312 transmit image data to the controller 314 to perform a quality control assessment of the patch 215 of protrusions, the vision inspection system 300" of FIG. 2D is capable of gathering image data to perform a quality control assessment of individual protrusions 209 within the patch 215. As shown in FIG. 2D, the vision inspection system 300" shows a camera 310 that is used to capture an oblique signal 326 from the illuminated patch 215 of protrusions 209. In these embodiments, the oblique signal 326 may be image data pertaining to individual protrusions 209 in the illuminated patch 215 and is transmitted to the controller 314. In an embodiment, the camera 310 and the light source **308*b* may disposed at an angle with respect to the patch 215 in a plane aligned along the MD, a plane aligned with the CD, or an intermediate angle between the MD and CD. In one embodiment, the camera 310 and light source 308*b* are oriented perpendicular to a nominal longitudinal axis of the protrusions 209 (e.g. to capture a side profile of the protrusions 209 as shown in FIG. 1G). Thus, in one example embodiment, for protrusions 209 with the nominal longitudinal axis along the MD, the camera 310 and the light source 308*b* are oriented in the CD. Whereas in another example embodiment, for protrusions 209 with the nominal longitudinal axis along the CD, the camera 310 and the light source 308 are oriented in the MD. The camera 310 and light source 308*b* may be on the same side relative to a hook or on opposite sides of a hook, even when both are on the same side of the substrate. Regardless of disposition relative to the machine, the camera may be angled to have a view of a side profile of a protrusion, using the example of FIG. 1G. In these embodiments, the controller 314 is configured to process the image data pertaining to the individual protrusions 209 in the patch 215 and assess whether the imaged individual protrusions 209 comply with one or more quality control criteria for protrusions 209. In some embodiments, the controller 314 processes the image data to measure one or more dimensions of the protrusions 209**.

In some embodiments, the vision inspection systems of FIGS. 2B through 2D is a vision system such as disclosed in U.S. Pat. No. 10,632,023. In these embodiments, the vision system is a low-profile, rigid mount designed to allow different camera options (e.g., line scan, area scan) and different lighting options (back-lit, front-lit) while ensuring that the field of view is correct for the patch 215 of protrusions. In some embodiments, the vision inspection system has the following features: the camera is installed at a fixed height above the substrate 211, the camera 312 is installed so that the field of view (FOV) centerline matches a standard converter centerline of the substrate 211 passing between the rolls 302, 304 (or systems 200, 500). In some embodiments, vision inspection system comes in three parts: a main plate, a camera mount and a lighting bracket. In some embodiments, the vision inspection system includes an unwind with splicing capability, a rotary forming module, and a rewind. In various embodiments, the vision inspection system is used to perform primary inspections comprising checking for holes in the substrate 211, counting the number of hooks on every patch 215, checking the shape of patches 215, and checking for the presence of hook fields.

Generated images of the patch 215 of protrusions 209 from the cameras 312 will now be discussed and how the controller 314 processes these images when performing a quality control assessment of the protrusions 209 in the patch 215. FIGS. 3A through 3D are images illustrating an example of a raw image 340 obtained of the substrate 211 with the unitary formed protrusions 209 and subsequent filtered images 342, 343, 344 used to perform a quality control inspection of the protrusions 209, according to various embodiments. In various embodiments, the raw image 340 is based on the image data received at the controller 314 from the camera 312. In an embodiment, the raw image 340 includes a plurality of pixels which each have an intensity value that corresponds with an intensity of the transmitted signal 322 (FIG. 2B, 2D) or reflected signal 324 (FIG. 2C) at respective locations along the illuminated patch 215. Since the protrusions 209 constitute a thicker region of the patch 215 relative to the areas between the protrusions 209, the intensity value of pixels in the image 340 corresponding to the protrusions 209 have a lower intensity value than the areas between the protrusions 209. As further shown in FIG. 3A, the raw image 340 also shows various portions of the patch 215 including a leading edge 250, trailing edge 252 and an arm 251. In various embodiments, the intensity value of the pixels near the leading edge 250 and trailing edge 252 is relatively high since these regions of the patch 215 may include thin spots (e.g. where the thickness of the patch 215 is less than a desired thickness).

In order to segregate the protrusions 209 within the raw image 340, in some embodiments the controller 314 processes the raw image 340 with a filter that only includes those pixels whose intensity value is below a threshold value in order to identify the protrusions 209 in the raw image 340. In an example embodiment, the intensity value of the pixels is a dimensionless value (e.g. between about 0 and about 255). In this example embodiment, the threshold value is about 240. In various embodiments, after applying this filter, each pixel has a binary value (1 or 0) depending on whether or not the intensity value of that pixel is less than the threshold value. Thus, after applying this filter, the filtered image 342 of FIG. 3C features bright pixels whose intensity value was less than the threshold value and dark pixels whose intensity value is greater than the threshold value. Similarly, the filtered image 343 of FIG. 3B features bright pixels whose intensity value is less than the threshold value and further depicts segregated regions 350, 352, 353 of the patch 215. In these embodiments, the controller 314 uses the segregated regions 350, 352, 353 to perform a quality control assessment of the number of protrusions 209 within each respective region (rather than the filtered image 342 which can be used to assess the number of protrusions 209 within the patch 215). Said differently, the first filter may ignore all pixels with insufficient opacity for some embodiments, which may include identifying protrusions via a backlit image. As used in this description, "filter" is used to describe any of a plurality of suitable image processing methods, such as threshold, object position tracking, tracking, filtering, particle filter, object detection tools, edge detection, measurement tools, hole detection and arc detection. In an example embodiment, these tools may be available in commercial software, such as NI Vision Builder available from National Instruments.

Figures 3A, 3B, 3C, 3D:
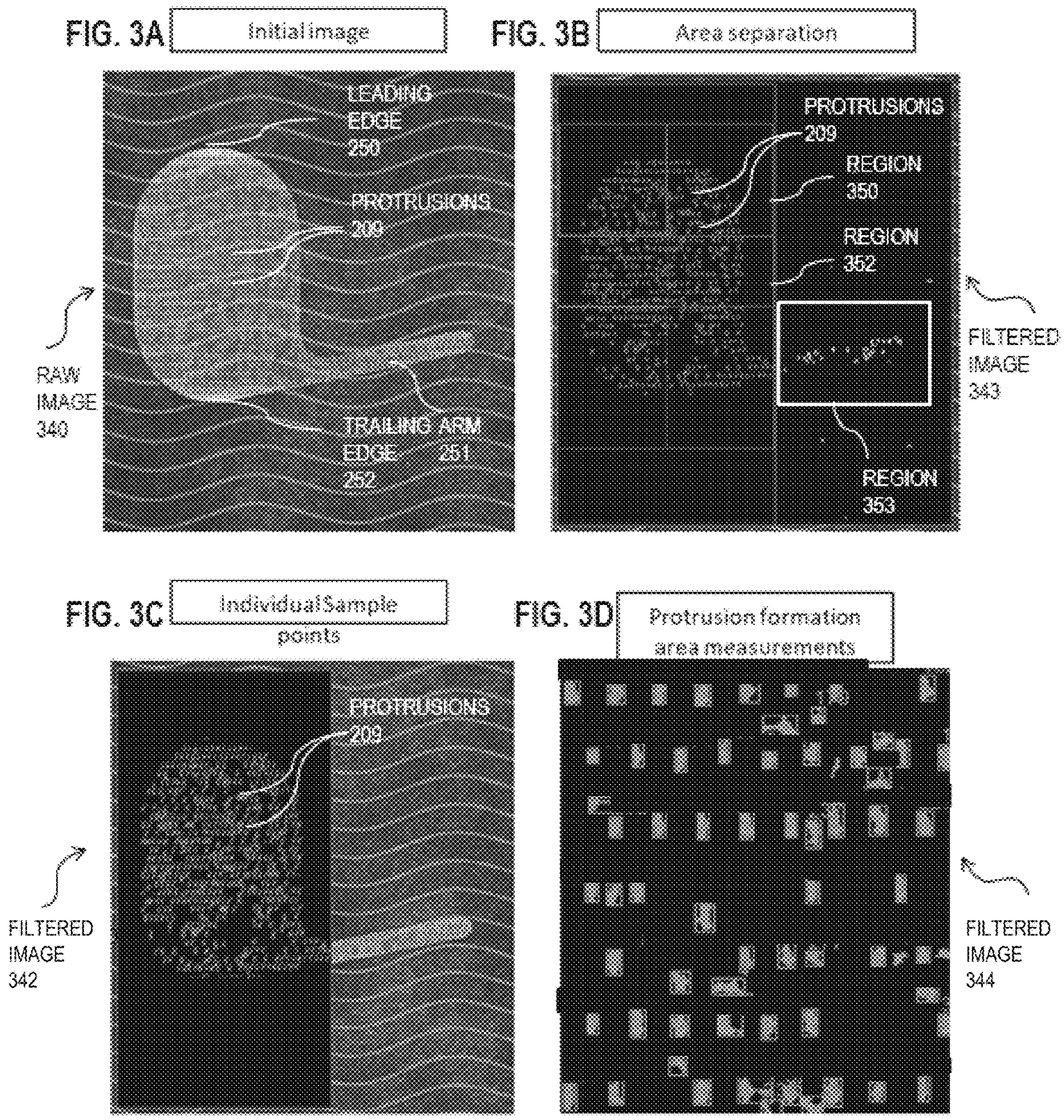
FIGS. 3A through 3D are images illustrating an example of a raw image obtained of the substrate with the unitary formed protrusions and subsequent filtered images used to perform a quality control inspection of the protrusions, according to various embodiments.

In various embodiments, the filtered images 342, 343 do not necessarily indicate the presence of one or more protrusions 209 and thus in a second filtering step the controller 314 further processes the filtered images 342, 343 to assess whether adjacent groups of similar opacity pixels in the filtered images 342, 343 have a size that is consistent with a protrusion 209. In an example embodiment, this second filtering step is performed with a particle size filter. In some embodiments, in this second filtering step, the controller 314 determines an area of adjacent groups of similar opacity pixels (e.g. a number of adjacent bright pixels in a group or a number of adjacent dark pixels in a group) and assesses whether the determined area is within an expected area range of a protrusion (using the particle size filter). In an example embodiment, in this second filtering step the controller 314 determines a dimension of the group of adjacent bright or dark pixels in FIG. 3C in a horizontal and vertical direction and compares this determined dimension with a minimum/maximum threshold in each direction for a protrusion, with the particle size filter In some embodiments, the particle filter may accept protrusions in a range between about 350 microns and about 450 microns in a first direction and between about 100 microns and about 150 microns in a second dimension. FIG. 3D illustrates a filtered image 344 that indicates an estimated area of adjacent groups of bright pixels in the filtered images 342, 343 which fall within a minimum/maximum area threshold of a protrusion 209, using the particle size filter. The particle filter may comprise a minimum feature size and or a maximum feature size. Separate size filters may be applied in a first direction and a second direction. The particle filter may comprise a minimum grayscale level and/or a maximum greyscale level. In some embodiments, the area of the filtered blob for each hook site via the first filter and/or the second filter may correspond with an area, where said area of a good hook (e.g., per FIG. 1M) is distinguishable from defective hooks 209'', 209''', 209'''', 209''''' or other defects.

Although the images of FIGS. 3A through 3D depict and discuss defects in the protrusions 209, in other embodiments the defects may include holes in or adjacent the formed patch, holes in the substrate, incomplete or missing protrusions, CD mistracking, MD phasing errors, splices or improperly formed hooks. In some embodiments, after generating the filtered image 344, the controller 314 is configured to count the hooks or other protrusions via the use of a particle size filter. In various embodiments, the hooks themselves may be indirectly measured (e.g. with the vision inspection system of FIG. 2D). In some embodiments, the size, shape, and presence of the hook field may be measured. In other embodiments, the length and width of the patch 215 may be measured. In still other embodiments, the spacing from an edge of the substrate 211 may be measured. In various embodiments, a spacing of intermediate hook patches in an MD or CD direction may be measured. The variables may be reported to the quality control system 600 and may be reported as defect data 502 with a timestamp, roll tracking number or code. Images of defects may be saved by the quality control system 600 for further processing.

In some embodiments, the controller 314 may perform a count of the protrusions 209 over an entire patch (FIG. 3C), or may perform a respective count of the protrusions 209 in respective subdivided regions (FIG. 3B). In various embodiments, some failure modes may occur in localized regions of the patch 215. For example, in some embodiments the blade sonotrodes of the apparatus 200 may commonly exhibit tears or thin regions at leading or trailing edges 250, 252 of the patch 215 (FIG. 3A). Hooks may be poorly formed at the transient leading and trailing edges 250, 252 of a patch if the ultrasonic amplitude or frequency control system, sonotrode positioning control system, sonotrode compression force control system, pre-heat control system, sonotrode cooling system, or rotary sonotrode speed control is poorly tuned or misadjusted. Setup errors resulting in wrinkles in the substrate may be localized.

In various embodiments, inspection zones of the substrate 211 that are assessed may be adjusted or fixtured relative to a detected position of a hook patch 215 or an insignia on the substrate 211. The regions of inspection may include leading edge 250, central and trailing edge 252 regions of the substrate 211. The regions may be left and right regions of any of the sub-regions. A lateral protrusion, such as an arm 251 disposed inboard from a distal fold line, may have a separate hook count (e.g. within the region 353 depicted in FIG. 3B). In some embodiments, the inspection zones may be fixtured, meaning the vision inspection may be programmed to detect an MD edge and or a CD edge of the patch 215, and inspect regions 350, 352, 353 relative to the detected position. By said means, the sub-zones may be help consistency despite minor variation in MD or CD position of the patch 215 relative to the machine phase.

Figure 4A:
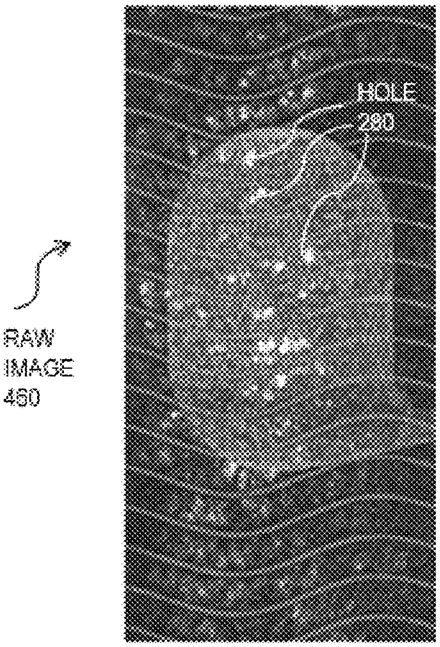
FIGS. 4A, 4B and 5A are images illustrating an example of a raw image obtained of the substrate with the unitary formed protrusions and subsequent filtered images used to perform a quality control inspection of the substrate, according to various embodiments.
Figure 4B:
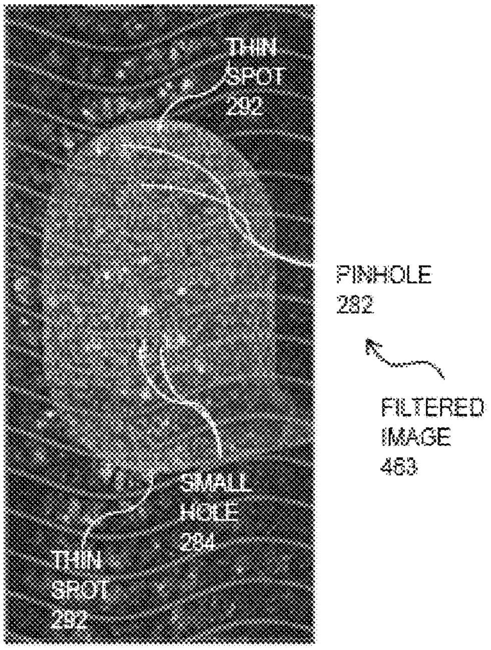
Figure 5A:
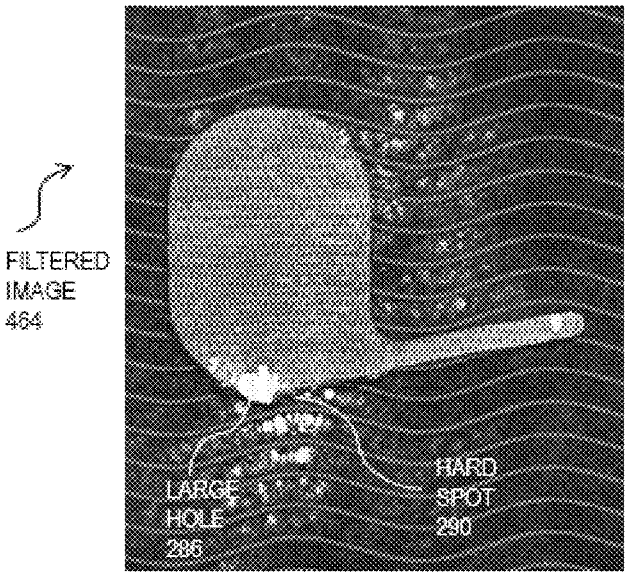

Generated images of the patch 215 of protrusions 209 from the cameras 312 will now be discussed and how the controller 314 processes these images when performing a quality control assessment of one or more defects (holes) in the patch 215. FIGS. 4A, 4B and 5A are images illustrating an example of a raw image 460 obtained of the substrate 211 with the unitary formed protrusions 209 and subsequent filtered images 463, 464 used to perform a quality inspection of the substrate, according to various embodiments. In various embodiments, the raw image 460 is similar to the raw image 340 of FIG. 3A in the sense that it depicts raw image data received by the controller 314 from the camera 312. However, unlike the raw image 340 of FIG. 3A the raw image 460 of FIG. 4A indicates one or more undesired holes 280 in the patch 215. Due to an absence of material at each hole 280, the intensity of the transmitted signal 322 detected by the camera 312 is relatively high. Thus, in various embodiments, the holes 280 within the raw image 460 can be identified by determining those pixels whose intensity value is above a threshold value. An example of a threshold value for hole detection with a backlit substrate may be 250 on a grayscale range of 0-255 (dimensionless), with 0 completely opaque and 255 as unimpeded transmission.

In various embodiments, in a first filtering step the controller 314 processes the image data of the raw image 460 by determining those pixels whose intensity value is above a threshold value. As with the first filtering step for identifying protrusions 209, in this first filtering step those pixels whose intensity value is above the threshold value is assigned a 1 binary value whereas the other pixels are assigned a 0 binary value. In a second filtering step, the controller 314 then processes this subset of the pixels with the 1 binary value to determine whether one or more dimensions of a group of adjacent pixels within this group is consistent with a dimension of various sized holes. In one example embodiment, the controller 314 includes the particle size filter 332 which includes dimensional thresholds (e.g. minimum dimension and maximum dimension in multiple dimensions) for multiple sized holes. In an example embodiment, pin may have a dimension of less than 1 $mm^2$, small holes may have a dimension between about 1 $mm^2$ and 3 $mm^2$, and large holes may have a dimension greater than about 3 $mm^2$. Thus, in various embodiments in a second filtering step the controller 314 applies each of the particle size filters 332 to the subset of pixels with the 1 binary value, to assess how many of each of the multiple sized holes are present in the patch 215. In some embodiments, the memory of the controller 314 also stores a threshold number of each sized hole above which the patch 215 is considered defective and should be marked as such. In an example embodiment, the threshold number of each sized hole depends on the size of the hole (e.g. all large holes are rejected, more than 1 small hole per patch is a defect, more than 1% small holes incidence rate causes a roll to be rejected, more than 2% pinholes requires a line stop, etc.).

In various embodiments, the filtered image 463 of FIG. 4B shows the result of the second filtering step discussed above, where the filtered image 463 indicates pin holes 282 in the patch 215 as well as small sized holes 284. In yet further embodiments, the filtered image 463 indicates thin spots 292 at the leading edge 250 and trailing edge 252 that indicate a region adjacent patch 215 where the opacity is less than a minimum opacity threshold and whose size is greater than an allowable maximum dimension or area.

In various embodiments, the filtered image 464 of FIG. 5A shows the result of the second filtering step discussed above, where the filtered image 464 indicates a large hole 286 at the leading edge 250 and a hard spot 290 at the leading edge 250. In one embodiment, the hard spot 290 is defined as a region of the patch 215 whose thickness is above a maximum thickness threshold.

In various embodiments, the hole detection may occur over the patch 215, adjacent the patch 215, or intermediate the patches 215. In some embodiments, leading edge 250 and trailing edge 252 holes or tears may be a common failure mode of the rotary formation process of the apparatus 200' of FIG. 1C. Additionally, these holes or tears may occur with any form of the rotary formation comprising rotary sonotrode (FIG. 1C), blade sonotrode (FIG. 1B), rotary with pre-heat, blade with pre-heat, multiple sonotrodes in series, and multiple sonotrodes in series with pre-heat. In various embodiments, the number of holes is counted for each patch 215. For each hole, the area of the hole is measured (e.g., in $mm^2$) for the largest holes. In some embodiments, the area of each of a plurality of the largest holes 286 is measured, currently for the five largest holes. In these embodiments, the holes are grouped into classifications, which may include large, small, and pinholes. Large holes may be those which are not acceptable in a finished product, and may comprise an area within a certain range (e.g., greater than 3 $mm^2$ and less than 10 $mm^2$). Small holes may be aesthetically objectionable, but may be tolerated at a low incidence rate. Small holes may have an area of 1 $mm^2$ to 3 $mm^2$. Pinholes may be difficult to visually detect, but may be aesthetically objectionable. Pinholes may be holes of less than 1 $mm^2$. Pinholes may be tolerated at a low incidence rate.

Figure 5B:
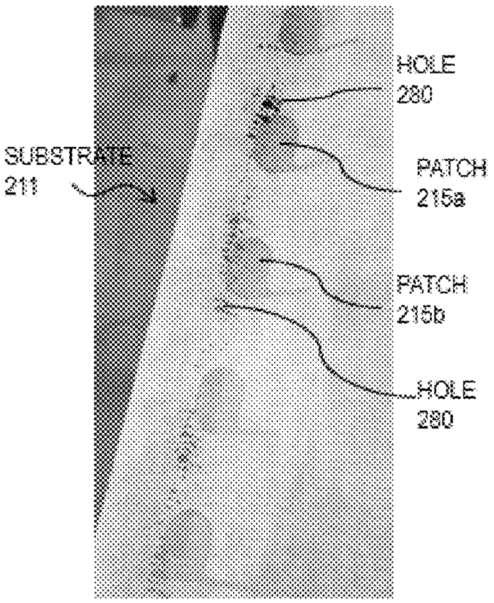
FIG. 5B is an image illustrating an example of a substrate with unitary formed protrusions including one or more defects in the substrate to be inspected by the system of FIGS. 2B through 2D, according to various embodiments.

In various embodiments, performance metrics may be based on an allowable parts per million (ppm) of pinholes, small holes, and/or large holes. In these embodiments, different ppm levels may be set for the various hole sizes. Holes within intermediate patches 215 (FIGS. 4A, 4B, 5A) may have a different threshold than holes 280 intermediate or adjacent to the patch 215 (FIG. 5B). For example, pinholes 280 in a non-woven region intermediate patches (FIG. 5B) may have a higher threshold limit than holes within the patch 215. Frequency and or size or pinholes or small holes may be used as an indicator of incipient process failures, such as large holes. In some embodiments, use of blade sonotrodes (FIG. 1B) or substrate pre-heat methods may increase the frequency or risk of holes. Blade sonotrodes may cause tearing due to shear forces. Pre-heat may cause burn thru within or without the patch region.

In various embodiments, the presence of hard spots 290 (FIG. 5A) in the patch 215 may be quantified by the vision inspection system. For example, hard ridges at the trailing edge 252 of the patch 215 may be objectionable to the wearer. In this example embodiment, these ridges may have a higher opacity than a non-woven or hook patch region. The presence of these hard ridges may be detected by the vision inspection system. The method of detection may be via opacity. The MD length, CD width or area of such a ridge may be measured. In other embodiments, foldovers, wrinkles or other defects in the substrate 211 may be quantified in a similar manner.

In various embodiments, one or more methods can be employed when performing a quality control assessment of the patches 215 of protrusions 209. These methods will now be discussed herein. FIGS. 6A through 6D are flow diagrams that illustrate an example of methods for performing a quality control assessment of the unitary formed protrusions 209 in the substrate 211. Although each flow diagram of FIGS. 6A through 6D is depicted as integral steps in a particular order for purposes of illustration, in other embodiments one or more steps, or portions thereof, are performed in a different order, or overlapping in time, in series or in parallel, or are deleted, or one or more other steps are added, or the method is changed in some combination of ways.

Figure 6A:
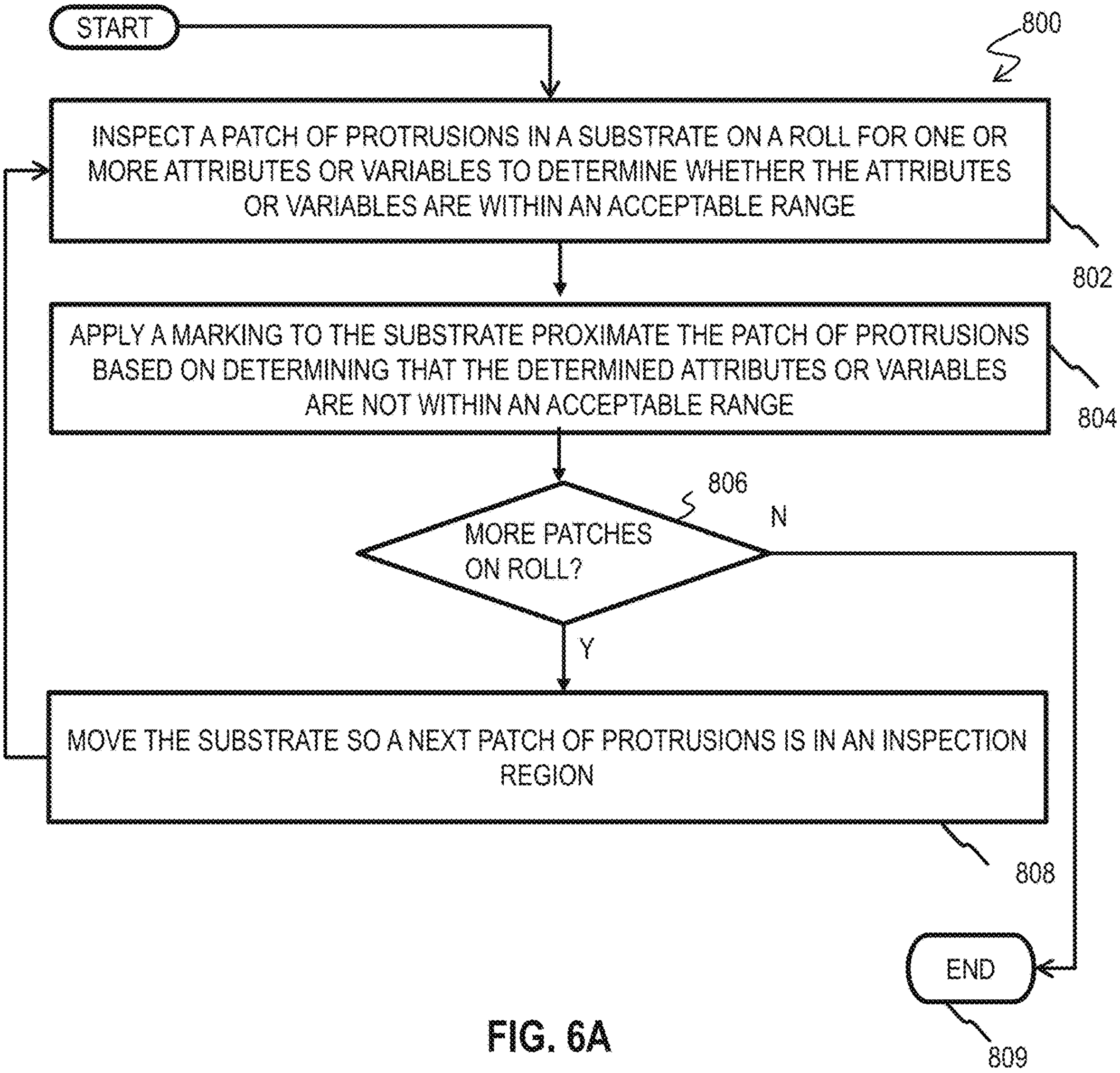
FIGS. 6A through 6D are flowcharts illustrating an example of a method for inspecting unitary formed protrusions in a substrate, according to various embodiments.

In various embodiments, FIG. 6A depicts a flowchart illustrating an example of a method 800 for performing quality control inspection of unitary formed protrusions 209 in the substrate 211. In step 802, a patch 215 of the unitary formed protrusions 209 in the substrate 211 is inspected for one or more attributes or variables. In various embodiments, step 802 is performed by one or more of the vision inspection systems of FIGS. 2B through 2D. In various embodiments, the variables or attributes include one or more of, but are not limited: a number of formed protrusions 209 in the patch 215, a number of formed protrusions 209 in different regions 350, 352, 353 of the patch 215, a number of different sized holes (e.g. pin hole, small hole, large hole) in the patch 215, a number of hard spots 290 and a number of thin spots 292.

In various embodiments, the controller 314 performs step 802 and determines the variables or attributes of the patch 215. In these embodiments, in step 802 the controller 314 also compares this determined variable or attribute of the patch 21 with a stored threshold value for the respective variable or attribute (e.g. that is stored in a memory of the controller 314). In one example embodiment, in step 802 the controller 314 compares a determined number of formed protrusions 209 in the patch 215 with a threshold number to determine whether the patch 215 includes a minimum threshold number of protrusions 209. In another example embodiment, in step 802 the controller 314 compares a determined number of formed protrusions 209 in different regions 350, 352, 353 of the patch 215 with a respective threshold number for each region to determine whether each region includes a minimum threshold number of protrusions 209. In yet another example embodiment, in step 802 the controller 314 compares the determined number of different sized holes (e.g. pin hole, small hole, large hole) in the patch 215 with a threshold number of each different sized hole, to assess whether the patch 215 has an unacceptable number of each sized hole. In yet another example embodiment, in step 802 the controller 314 compares the determined number of hard spots 290 or thin spots 292 with a respective threshold number for each of the hard spots 290 or thin spots 292 to assess whether the patch 215 has an unacceptable number of the hard spots 290 or thin spots 292.

In various embodiments, when the controller 314 determines in step 802 that the attributes or variables of the patch 215 is not within an acceptable range, the controller 314 determines that one or more defects are present in the patch 215. Based on this determination, in step 804 the marking system 400 (e.g. defect marking device 402) applies a marking to the patch 215 of the substrate 211 based on the determination in step 802. In various embodiments, in step 804 the controller 314 transmits a signal to the defect marking device 402 so that the defect marking device 402 (e.g. ink jet printer, QR code marking device, etc.) marks the substrate 211' with a mark to indicate the presence of the defect in the patch 215. In some embodiments, the mark imposed on the substrate 211 in step 804 is a mark indicating that a defect is present in the patch 215. In other embodiments, the mark imposed on the substrate 211 in step 804 is a mark with indicia (e.g. QR Code, barcode, alphanumeric code) that conveys data 502 about the defect (e.g. an identifier of the specific patch 215 with the defect, an identifier of the specific region 350, 352, 353 of the patch 215 with the defect, an identifier of the specific type of defect in the patch 215, etc.).

In various embodiments, after applying the marking to the substrate 211 in step 804 to indicate the one or more defect, in step 806 the controller 314 determines whether more patches 215 are provided on the roll 302. In some embodiments, in step 806 the controller 314 (e.g. Programmable Logic Controller or PLC) determines that more patches 215 are on the roll 302 based on a signal received from the trigger sensor 306 to indicate a presence of a next patch to be illuminated by the light source 308. In other embodiments, in step 806 the controller 314 determines that more patches 215 are on the roll 302 based on an electronic means (e.g. sensor 306 which sends regular signals to the controller 314 until a predetermined number of patches 215 on a roll 302 have passed the light source 308).

In various embodiments, upon the controller 314 determining at step 806 that more patches 215 are on the roll 302, in step 808 the substrate 211 is moved so that a next patch 215 is positioned to be inspected by the vision inspection system 300. The method 800 then moves back to step 802.

In various embodiments, upon the controller 314 determining at step 806 that no more patches 215 are on the roll 302, the method ends at block 809.

In various embodiments, the method 800 of FIG. 6A is utilized in conjunction with the absorbent article manufacturing system 700, to ensure defective product does not reach consumers. The vision inspection system disclosed here is a key detection system to perform step 802 and identify defects in the patch 215 on the substrate 211. Defects may be monitored on a per roll basis relative to chosen process limits, and rolls rejected or culled as scrap prior to delivery from the protrusion forming system 200 to the absorbent article manufacturing system 700. In various embodiments, a minimal defect rate is common in most industrial processes. To minimize waste of the substrate 211 with protrusions 209, defects may be marked in step 804. In some embodiments, the marked defects may be subsequently detected and rejected on an absorbent article manufacturing line. Reject marking may enable a minimum number of pads or other absorbent articles to be rejected, rather than an entire roll of substrate with formed protrusions. Marked defects may be inspected by the reject mark verification system 500, where an indicia was applied by the marking system 400 in a positional relationship to the defect. In some embodiments, the substrate 211 may be fed into the absorbent article manufacturing system 700, which may comprise a diaper converter.

In some embodiments, a vision inspection 300, 300', 300" may also be featured in conjunction with the absorbent article manufacturing system 700 to perform step 802. In these embodiments, detection of marked defects or performing a secondary inspection of the substrate 211 may be performed in step 802 by the vision system at the absorbent manufacturing system 700. In some embodiments, detection of the defect in step 802 at the absorbent manufacturing system 700 may comprise a simplified inspection, such as detection of a marked defect insignia (e.g. with a reject mark verification system 500 which may be positioned at the same location as the absorbent manufacturing system 700).

In other embodiments, detection of the defects in step 802 at the absorbent article manufacturing system 700 may include a subset of the inspections on the vision inspection system 300 that is upstream of the system 700. In these embodiments, this performing of the subset of the inspections in step 802 at the system 700 may be executed in a manner that is the same or different as the inspection on the vision inspection system 300. For example, the absorbent article manufacturing system 700 may have a reject mark verification system 500 for marked indicia, which may comprise a simple optic checking for a mark such as a dark inkjet printer mark on a portion of the substrate 211 in proximate relation to a defect. In various embodiments, this inspection of step 802 may comprise a high speed code reader that can simultaneously detect position and decode data 502 from an encoded mark near the defect for use to directly control rejection of one or more products, or contain information about the defects from the primary inspection that may be incorporated into the data record of the second machine.

In still other embodiments, step 802 may be performed at the absorbent article manufacturing system 700 and includes inspecting for holes or tears in the substrate 211 that may occur during winding of the substrate 211 on the roll 304, after which the substrate 211 was unrolled from the roll 304 to the absorbent article manufacturing system 700. In some embodiments, these tears or holes can be due to winding stresses, transport, unwinding, splice transients, due to aging, or many other root causes. In some embodiments, step 802 is performed a first time by the vision inspection system 300, where the cost of complexity of the system 300 in financially justified since this vision inspection system 300 inspects the substrate 211 that supplies in the absorbent article manufacturing system 700. In these embodiments, step 802 may be performed a second time at the absorbent article manufacturing system 700 by a second vision inspection system 300 such that a rigorous detection may be applied to every patch 215 at a first location and a second location. In one example embodiment, the rate of inspection may be less at the second location, since the substrate 211 at the second location has already been inspected by the first vision inspection system 300 upstream of the absorbent article manufacturing system 700.

In various embodiments, the marking applied in step 804 may include printing or forming an insignia on or in the substrate 211. In some embodiments, the insignia may comprise a timecode, a tracking number such as an incremental patch number, a tracking number such as an incremental marked defect number, a QR code, or combinations thereof. In some embodiments, an electronic file of all or some of the quality parameters for a roll may be recorded. The file may comprise every patch, a subset of a plurality of patches, or the marked defects. In various embodiments, information about the local defect (defect data 502) may be encoded with the insignia itself. Rolls 304 with excessive defects may be sent to a rework station intermediate the protrusion forming system 200 and absorbent article manufacturing system 700. In some embodiments, regions of high defect rate may be excised from the rolls 304. For example, in these embodiments the roll 304 is unwound to a first marked defect, a section is excised between a first and second marked defect and the roll is rewound. This defect culling may occur once or a plurality of occurrences.

The method 830 of FIG. 6B will now be discussed, which involves using the vision inspection system to perform a quality control inspection of the patch 215 of unitary formed protrusions 209. In step 832, the patch 215 of protrusions 209 is illuminated by the incident signal 320 of the light source 308, 308'.

In step 834, an image is acquired of the illuminated patch 215 based on step 832. In some embodiments, in step 834 the camera 312 receives the transmitted signal 322 (FIG. 2B), the camera 312 receives the reflected signal 324 (FIG. 2C) or the cameras 312*a*, 312*b* receive the transmitted signals 322*a*, 322*b* (FIG. 2D) or camera 310 receives the oblique signal 326 (FIG. 2D). In these embodiments, the camera then transmits image data to the controller 314.

In step 836, the controller 314 then processes the image data received in step 834 to determine an intensity value of each of a plurality of pixels in the image. In an embodiment, this image data indicates the intensity value of each pixel in the raw images 340, 460 (FIGS. 3A, 4A).

In step 838, the controller 314 performs a first filtering step on the image data. In various embodiments, this step is performed by determining a subset of the plurality of pixels whose intensity value is greater than a high threshold value (to identify pixels of a potential hole) or less than a low threshold value (to identify pixels of a potential protrusion). In some embodiments, the result of this step is assigning a binary value to each pixel, namely 1 if the intensity value is greater than the threshold value or lower than the threshold value and 0 otherwise. As previously discussed, pixels corresponding to protrusions 209 have a lower intensity value since the transmitted signal 322 passes through a thicker region of the substrate 211 whereas pixels corresponding to holes 280 have a higher intensity value since the transmitted signal 322 passes through a thinner region of the substrate 211. In some embodiments, in step 838 the controller 314 determines a subset of pixels where the intensity value is less than the low threshold value, to determine the subset of pixels which may correspond to protrusions. One example embodiment of this determination is shown in FIGS. 3B and 3C where the subset of pixels that may correspond to protrusions have a high intensity value. In other embodiments, in step 838 the controller 314 determines a subset of pixels where the intensity value is greater than a high threshold value, to determine the subset of pixels which may correspond to holes. One example embodiment of this determination is shown in FIGS. 4B and 4C where the subset of pixels that may correspond to holes have a high intensity value.

In step 840, the controller 314 determines a presence of objects in the patch 214 based on the determined subset of pixels from step 838. In one embodiment, in step 840 the controller 314 determines a group of adjacent pixels among the subset of pixels identified in step 838. In some embodiments, this group of adjacent pixels may correspond to a protrusion or hole, subject to a second filtering step to be performed in step 842. In this embodiment, step 840 is provided so that the controller 314 can take the subset of pixels from step 838 and determine potential protrusions and holes.

In step 842, a second filtering step is performed by the controller 314 to determine whether the candidates for protrusions and holes in step 840 are genuine protrusions or holes. As previously discussed, step 840 identified a group of adjacent pixels that may correspond to protrusions or holes. Step 842 is provided to verify whether this group of adjacent pixels from step 840 corresponds to a genuine protrusion or hole. In various embodiments, in step 842 a particle size filter 332 is used to determine whether the group of adjacent pixels from step 840 has one or more dimensions that correspond to a dimensional range of each of the protrusions and holes. In some embodiments, the particle size filter 332 includes a minimum/maximum dimension of the protrusion in an X dimension and a minimum/maximum dimension of the protrusion in the Y dimension. Thus, in these embodiments, the controller 314 determines one or more dimensions of the group of adjacent pixels from step 840 that may correspond to a protrusion and determines whether or not these dimensions fall within the minimum/maximum dimension range in each dimension from the particle size filter 332. Similarly, in these embodiments, the controller 314 determines one or more dimensions of the group of adjacent pixels from step 840 that may correspond to a hole and determines whether or not these dimensions fall within the minimum/maximum dimension range in each dimension from the particle size filter 332. Different particle sized filters 332 are used to assess protrusions and holes (e.g. a different minimum/maximum value for each dimension is provided for protrusions and holes).

In step 844, the controller 314 determines a value of a parameter of the protrusion or hole identified in step 842. In one embodiment, the determined parameter value in step 844 is a number of protrusions 209 in the patch 215 or in a respective region 350, 352, 353 of the patch 215. In other embodiments, the determined parameter value in step 844 is a number of holes 280 in the patch 215 or in respective regions 350, 352, 353 of the patch 214. In still other embodiments, the determined parameter value in step 844 is a number of respective sized pin holes 282, small holes 284 and large holes 286. In still other embodiments, the determined parameter value in step 844 is a number of hard spots 290 and thin spots 292.

In step 846, the controller 314 then compares the determined parameter value in step 844 with a threshold value of the parameter value. In some embodiments, the minimum threshold for hooks in a patch or a patch region may be 95% or more, or 90% or more or 80% or more or at least 60% or for a full patch at least 800 or at least 700 or at least 600 or at least 500 hooks. In various embodiments, in step 846 the controller 314 compares the determined number of protrusions 209 in the patch 215 with a minimum threshold number of protrusions 209 in the patch 215. In some embodiments, in step 846 the controller 314 detects a defect in the patch 215 if the number of protrusions 209 are less than the minimum threshold number. In various embodiments, in step 846 the controller 314 compares the determined number of protrusions 209 in different regions 350, 352, 353 of the patch 215 with a minimum threshold number of protrusions 209 in each respective region. In some embodiments, in step 846 the controller 314 detects a defect in the patch 215 if the number of protrusions 209 in one or more regions is less than the minimum threshold number. In other embodiments, in step 846 the controller 314 compares the number of holes 280 in the patch 215 or in respective regions 350, 352, 353 of the patch 214 with a maximum threshold number of holes 280 in the patch 215 or respective region. In some embodiments, in step 846 the controller 314 detects a defect in the patch 215 if the number of holes is greater than the maximum threshold number. In still other embodiments, in step 846 the controller 314 compares the number of respective sized pin holes 282, small holes 284 and large holes 286 with a respective maximum threshold value of each sized hole. In some embodiments, in step 846 the controller 314 detects a defect in the patch 215 if the number of holes in each region exceeds the maximum threshold number in one or more regions. In still other embodiments, in step 846 the controller 314 compares the determined area of hard spots 290 or thin spots 292 in the patch 215 with a respective maximum threshold area of hard spots or thin spots. In some embodiments, in step 846 the controller 314 detects a defect in the patch 215 if the number of hard spots or thin spots exceeds the maximum threshold number.

In some embodiments, after step 846 the method 830 may perform a step similar to step 804 of FIG. 6A and apply a marking to the substrate 211 to indicate the presence of a defect determined in step 846.

In step 847, the controller 314 determines whether more patches 215 have yet to be inspected on the roll 302. This step 847 is performed in a similar manner as step 806 of FIG. 6A.

In step 848, the substrate 211 is moved so that a next patch 215 can be inspected by the vision inspection system. This step 848 is performed in a similar manner as step 808 of FIG. 6A.

Figure 6B:
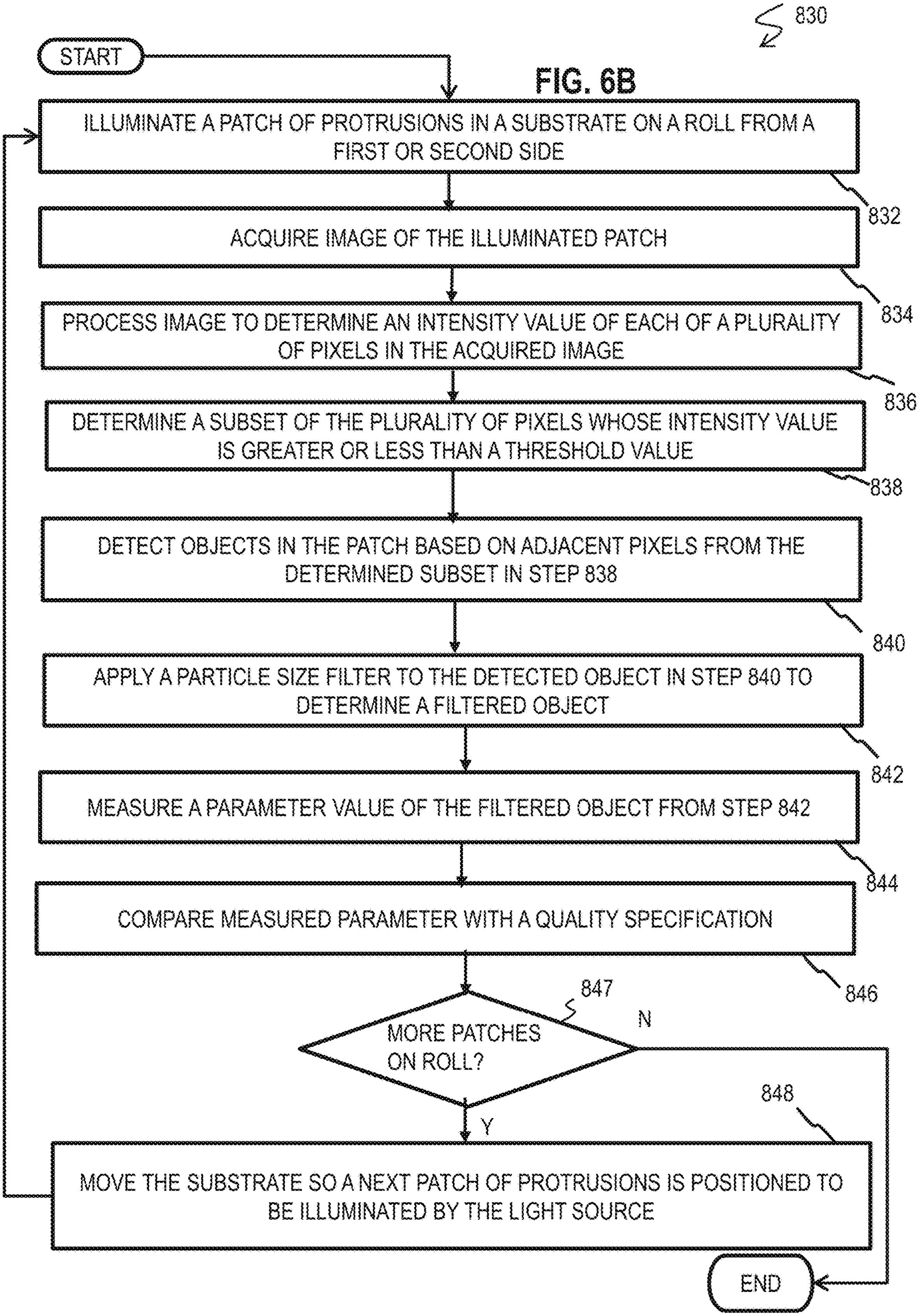
Figure 6C:
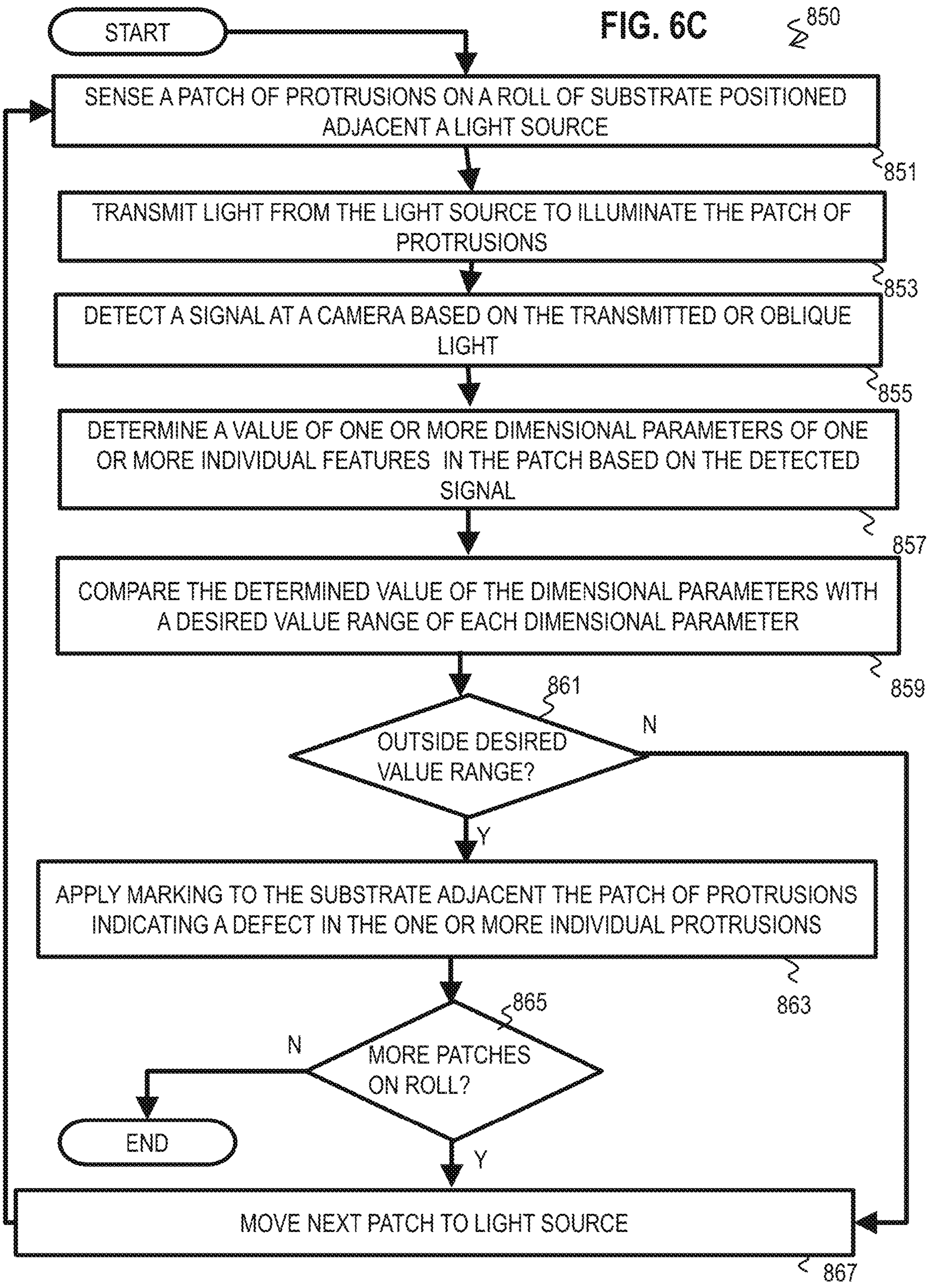
Figure 6D:
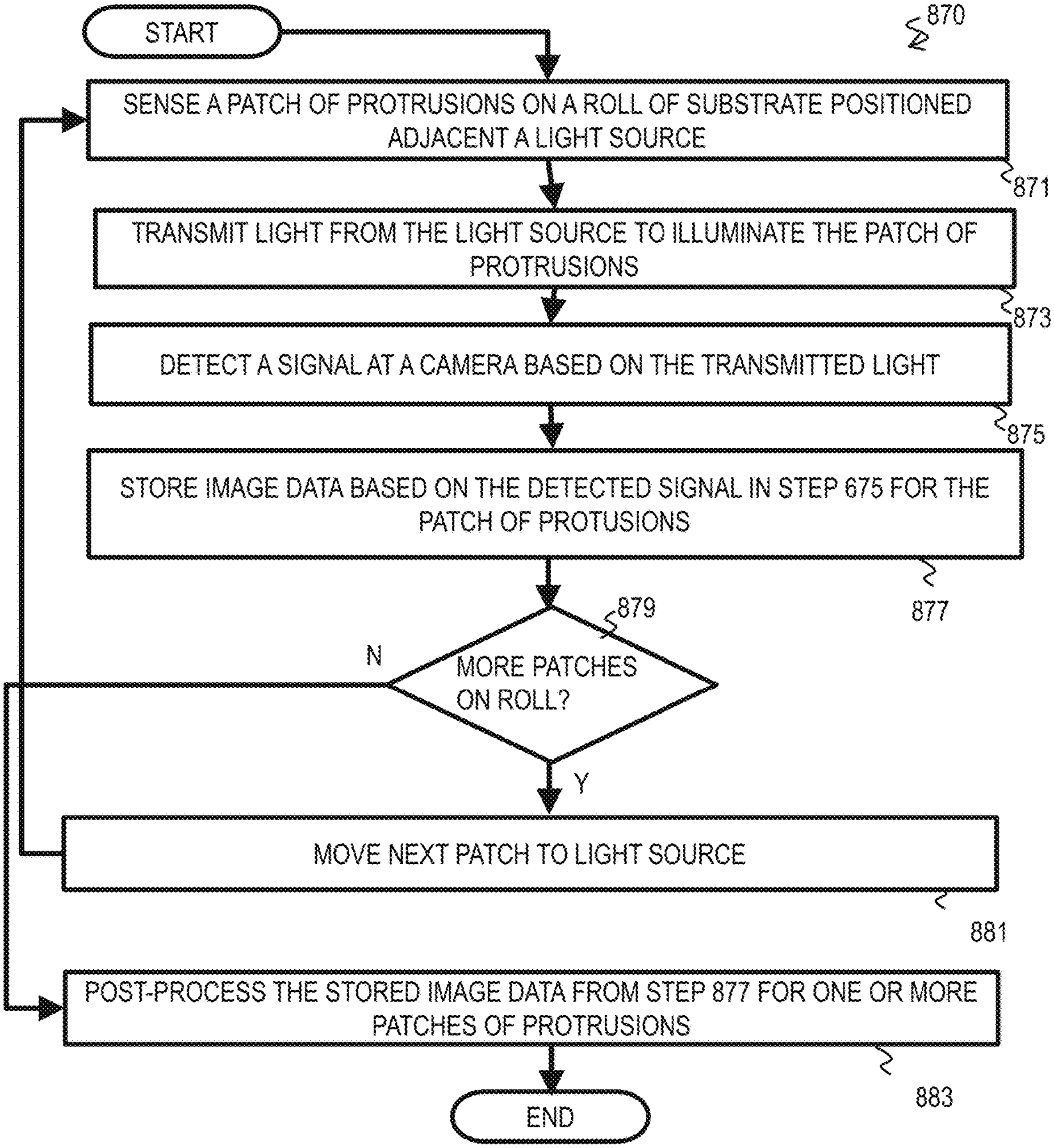

While the flowchart 830 of FIG. 6B is provided to inspect patches 215 of protrusions 209 and determine defects in these patches 215, the flowchart 850 of FIG. 6C is provided to inspect individual protrusions 209 and determine whether defects are present in the individual protrusions 209.

Step 851 involves sensing the presence of a patch 215 of protrusions 209 adjacent the light source 308 such that the patch 215 of protrusions 209 can be illuminated by the light source 308. In some embodiments, in step 851 the trigger sensor 306 transmits a signal to the controller 314 based on detecting a presence of the patch 215 in an area to be illuminated by the light source 308. In other embodiments, in step 851 the trigger sensor 306 automatically transmits a signal to the controller 314 or camera 310 at interval times, based on a predetermined number of protrusions 215 on the roll 302 and ceases to transmit the signal when the last protrusion 215 is illuminated by the light source 308.

Step 853 is similar to step 832 previously discussed with respect to the method 830 of FIG. 6B.

In step 855, the oblique signal 326 is detected by the camera 310. In some embodiments, unlike the method 830 of FIG. 6B, where the cameras 312 are used to capture the image data, in the method 850 of FIG. 6C the camera 310 is used to capture the oblique signal 326. In some embodiments, an orientation angle of the camera 310 lens relative to the substrate 211 is known, which is subsequently used in step 857 in determining one or more parameter values associated with the individual protrusions 209 in the patch 215. In various embodiments, based on step 855 the camera 310 transmits image data to the controller 314 for further processing.

In step 857, the controller 314 processes the image data received from the camera 312 to determine a value of one or more dimensional parameters of the individual protrusions 209 in the patch 215. FIGS. 1E and 1F depict an example of an image processed by the processor 314 in step 857. In various embodiments, in step 857 the controller 314 processes the image data to determine a value of one or more of the parameters 221, 222, 224, 225, 227, 228, 230 shown in FIG. 1G. In some embodiments, the determined value of the one or more parameters is scaled based on an incident angle of the camera 310 relative to the substrate 211, as discussed in step 855.

In step 859, the determined dimensional parameter value(s) from step 857 are compared with a desired value range for each dimensional parameter. In some embodiments, the value of the height 221 of one or more protrusions 209 determined in step 857 is compared with a desired range of values for the height 221. In an embodiment, the desired value range of each dimensional parameter is stored in a memory of the controller 314. In some embodiments, the parameter 221 may have a desired value range between about 350 microns and about 400 microns; the parameter 222 may have a desired value range between about 375 microns and about 425 microns; the parameter 226 may have a desired value range between about 150 microns and about 200 microns; the parameter 227 may have a desired value range between about 120 microns and about 140 microns; the parameter 228 may have a desired value range between about 90 microns and about 110 microns; and the parameter 230 may have a desired value range between about 375 microns and about 415 microns; and/or the parameter 224 may have a desired value range between about 100 microns and about 130 microns. In other embodiments, this same comparison is performed for one or more other dimensional parameters depicted in FIG. 1G.

In step 861, the controller 314 determines whether the determined dimensional parameter value(s) in step 857 is outside the desired value range, based on the comparison in step 859. If the determination is affirmative in step 861, the method 850 moves to step 863. If the determination is negative in step 861, the method 850 moves to step 867.

In step 863, the controller 314 has determined that the determined dimensional parameter value from step 857 is outside the desired value range for that dimensional parameter. In one example, the broken protrusion 209" in FIG. 1I is inspected in the method 850 and the base 222 dimensional parameter has a value that is outside the desired value range. Specifically, since the protrusion 209" has broken from the substrate 211, the value of the base 222 dimensional parameter is zero or far below the desired value range.

In some embodiments, step 863 is performed in a similar manner as step 804, with the exception that the marking is provided to indicate a defect in the individual protrusion(s) 209 rather than to indicate a defect in the patch 215 of protrusions 209 (step 804). In various embodiments, in step 863 the controller 314 transmits a signal to the defect marking device 402 (e.g. inkjet printer, QR code marking device, etc.) to mark the substrate 211 with a marking that indicates that one or more protrusions 209 are defective and/or that communicates data (e.g. defect data 502) with specifics about the defective one or more protrusions 209 (e.g. where the defect data 502 specifically indicates whether the protrusions are partially formed, as in FIG. 1H, are broken as in FIG. 1I or are absent as in FIG. 1J).

Steps 865 and 867 are similar to steps 806 and 808.

A key unmet need that is met by the method 850 of FIG. 6C is to measure the quality of formation of the hooks. Holes and missing hooks are common failure modes and can be inspected and detected by the method 830 of FIG. 6B. However, passing those tests does not guarantee that the quality of individual protrusions is acceptable. Conventional approaches to this problem utilize a manual test for dynamic shear. However, such manual tests are labor intensive and may be performed only on a limited sample size during ongoing production. Instead, the improved method 850 of FIG. 6C collects an oblique image with the camera 310 of one or a plurality of protrusions 209. The images gathered in step 855 could be a sampled subset of the protrusions 209 on a given patch 215. The shape of the protrusion 209 can be graded by the vision inspection system 300" of FIG. 2D based on a magnified image of one or more protrusions 209 (FIGS. 1E-1F). Various dimensional parameters may be measured in step 857 including the protrusion height 221, free cantilevered length, distance from free end to substrate and angle of leading and trailing nominally vertical components. In still other embodiments, the method 850 checks for fractures or cracks 240 (FIG. 1H) of leading and trailing edges of the individual protrusions 209. In various embodiments, the location of the protrusion to be measured in the patch 215 may be selectable, and may be varied between several positions, which may comprise a central region, a leading edge region, a trailing edge region, an inboard region of a central zone, and outboard region of a central zone, a distal protrusion from a central zone, or a medial protrusion from a central zone.

A method is now discussed which can be used to store image data of each patch 215 from the method 830 of FIG. 6B or of each individual protrusion 209 from the method 850 of FIG. 6C. This method can be employed to store this image data in addition to any defect data 502 of the patch 215 or protrusion 209 for subsequent analysis during one or more post-processing steps.

Steps 851 through 875 are similar to steps 851 through 853 that were previously discussed.

Step 877 is performed by storing image data that was received by the controller 314 from the one or more cameras 310, 312. In one embodiment, in step 877 the controller 314 stores the image data in a memory of the controller 314. In still other embodiments, in step 877 the controller 314 stores in the image data and itemizes this storage based on one or more index parameters (e.g. an identifier of the roll 302, an identifier of the supplier of the roll 302, a time and date of the inspection and image data gathering, etc.).

Steps 879 and 881 are similar to steps 865 and 867 that were previously discussed.

Step 883 includes post-processing the stored image data in step 877.

Hardware Overview

Figure 7:
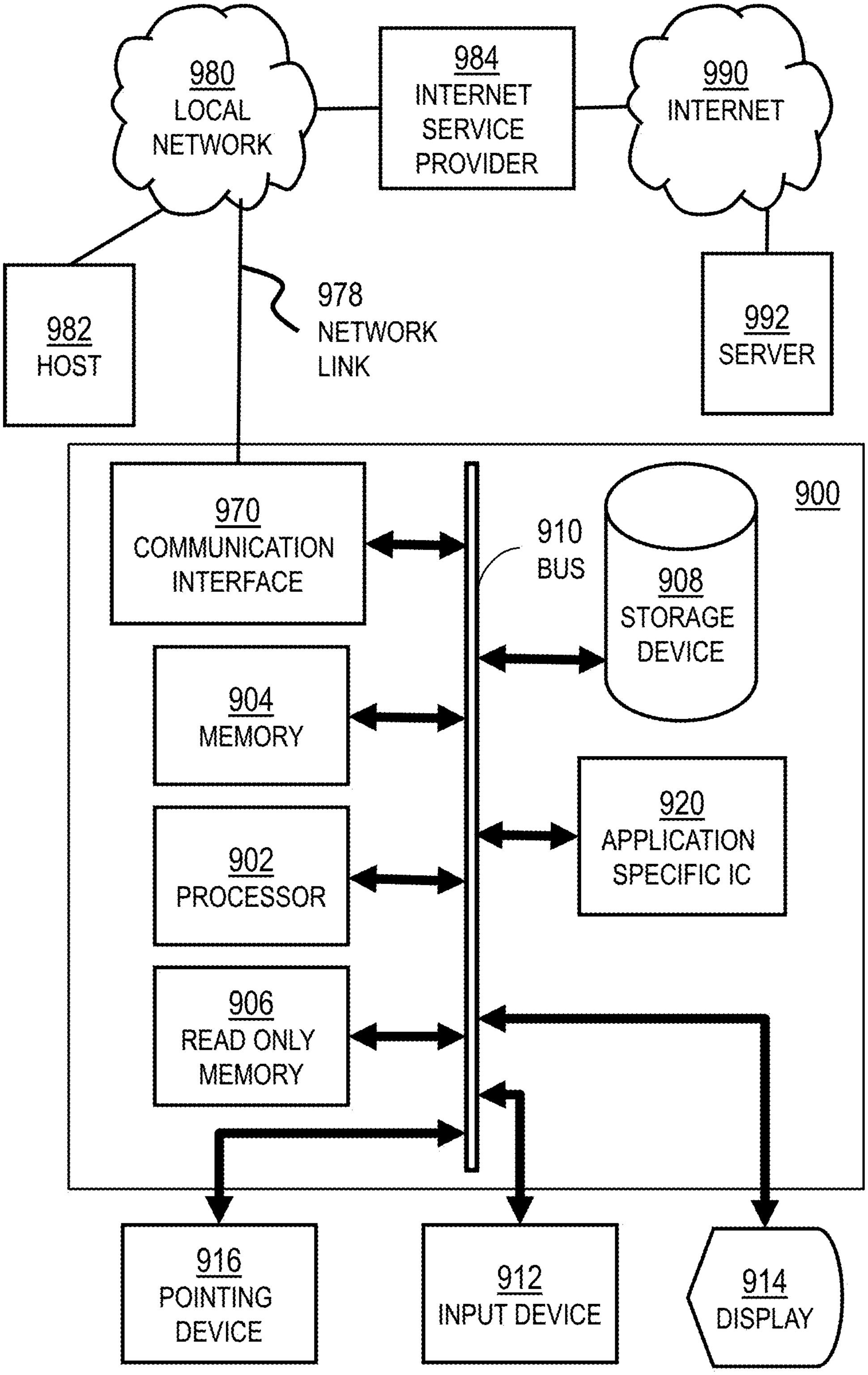
FIG. 7 is a block diagram that illustrates a computer system upon which an embodiment of the invention may be implemented, according to various embodiments.

FIG. 7 is a block diagram that illustrates a computer system 900 upon which an embodiment of the invention may be implemented. Computer system 900 includes a communication mechanism such as a bus 910 for passing information between other internal and external components of the computer system 900. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of one or more methods described herein.

A sequence of binary digits constitutes digital data that is used to represent a number or code for a character. A bus 910 includes many parallel conductors of information so that information is transferred quickly among devices coupled to the bus 910. One or more processors 902 for processing information are coupled with the bus 910. A processor 902 performs a set of operations on information. The set of operations include bringing information in from the bus 910 and placing information on the bus 910. The set of operations also typically include comparing two or more units of information, shifting positions of units of information, and combining two or more units of information, such as by addition or multiplication. A sequence of operations to be executed by the processor 902 constitutes computer instructions.

Computer system 900 also includes a memory 904 coupled to bus 910. The memory 904, such as a random access memory (RAM) or other dynamic storage device, stores information including computer instructions. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of computer instructions. The computer system 900 also includes a read only memory (ROM) 906 or other static storage device coupled to the bus 910 for storing static information, including instructions, that is not changed by the computer system 900. Also coupled to bus 910 is a non-volatile (persistent) storage device 908, such as a magnetic disk or optical disk, for storing information, including instructions, that persists even when the computer system 900 is turned off or otherwise loses power.

Information, including instructions, is provided to the bus 910 for use by the processor from an external input device 912, such as a keyboard containing alphanumeric keys operated by a human user, or a sensor. A sensor detects conditions in its vicinity and transforms those detections into signals compatible with the signals used to represent information in computer system 900. Other external devices coupled to bus 910, used primarily for interacting with humans, include a display device 914, such as a cathode ray tube (CRT) or a liquid crystal display (LCD), for presenting images, and a pointing device 916, such as a mouse or a trackball or cursor direction keys, for controlling a position of a small cursor image presented on the display 914 and issuing commands associated with graphical elements presented on the display 914.

In the illustrated embodiment, special purpose hardware, such as an application specific integrated circuit (IC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 970 sends and receives electrical, acoustic or electromagnetic signals, including infrared and optical signals, that carry information streams, such as digital data.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 902, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 902, except for carrier waves and other signals.

Logic encoded in one or more tangible media includes one or both of processor instructions on a computer-readable storage media and special purpose hardware, such as ASIC *920.

Network link 978 typically provides information communication through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990. A computer called a server 992 connected to the Internet provides a service in response to information received over the Internet. For example, server 992 provides information representing video data for presentation at display 914.

The invention is related to the use of computer system 900 for implementing the techniques described herein. According to one embodiment of the invention, those techniques are performed by computer system 900 in response to processor 902 executing one or more sequences of one or more instructions contained in memory 904. Such instructions, also called software and program code, may be read into memory 904 from another computer-readable medium such as storage device 908. Execution of the sequences of instructions contained in memory 904 causes processor 902 to perform the method steps described herein. In alternative embodiments, hardware, such as application specific integrated circuit 920, may be used in place of or in combination with software to implement the invention. Thus, embodiments of the invention are not limited to any specific combination of hardware and software.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server 992 transmits program code for a particular application, requested by a message sent from computer 900, through Internet 990, ISP equipment 984, local network 980 and communications interface 970. The received code may be executed by processor 902 as it is received, or may be stored in storage device 908 or other non-volatile storage for later execution, or both. In this manner, computer system 900 may obtain application program code in the form of a signal on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red a carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 8:
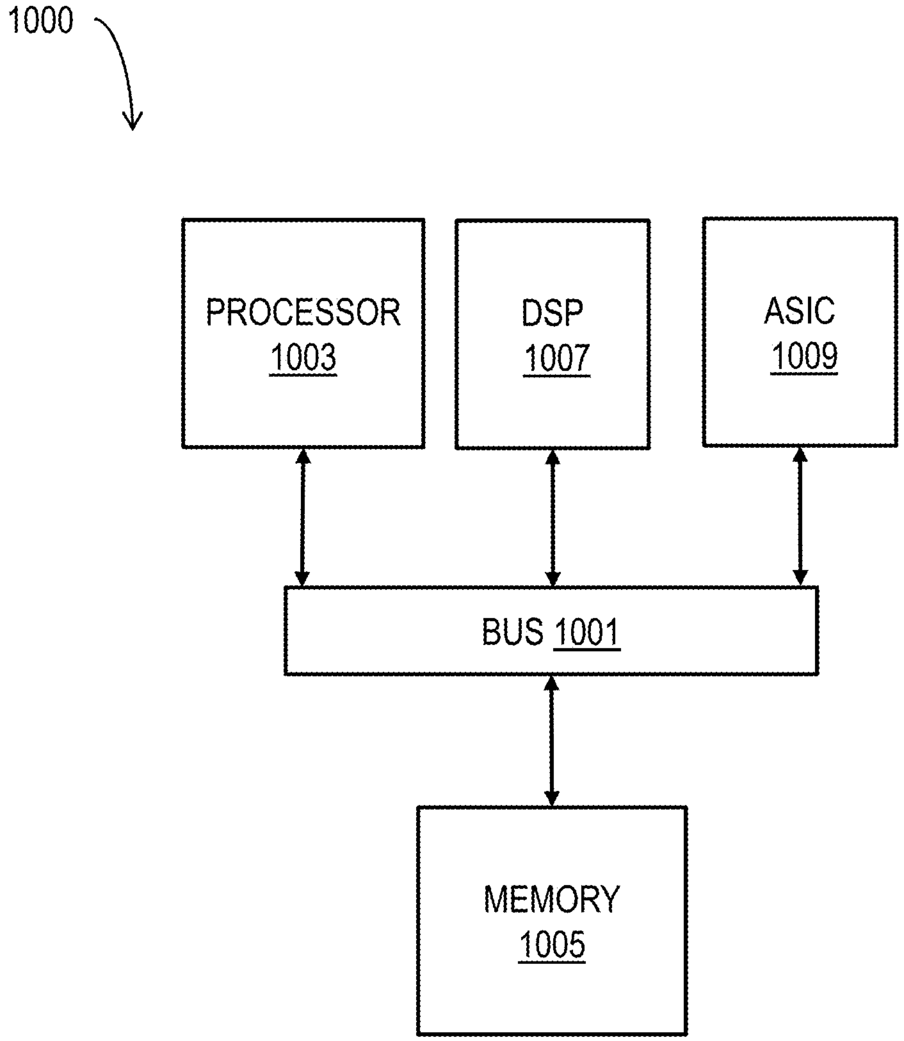
FIG. 8 is a block diagram that illustrates a chip set upon which an embodiment of the invention may be implemented, according to various embodiments.

FIG. 8 illustrates a chip set 1000 upon which an embodiment of the invention may be implemented. Chip set 1000 is programmed to perform one or more steps of a method described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of a method described herein.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multicore processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1005 also stores the data associated with or generated by the execution of one or more steps of the methods described herein.

Examples/Combinations

A1. A method of forming protrusions (209) in a portion (215) of a substrate (211) comprising:
- providing a first device (201) comprising an outer surface (203);
- providing a second device (202, 202') comprising a source of vibration energy (205);
- forming a nip (204, 204') between the source of vibration energy (205) and the outer surface (203);
- conveying the substrate (211) through the nip (204);
- forming the protrusions (209) in the portion (215) of the substrate (211) in the nip (204) using the source of vibration energy (205); and
- inspecting (800) one or more characteristics (280, 290, 292, 294) of the substrate (211) using a vision system (300).

A2. The method of paragraph A1, wherein the source of vibration energy (205) applies vibration energy to the substrate (211) intermittently or continuously.

A3. The method of paragraph A1 or paragraph A2, comprising imparting thermal energy to the portion (215) of the substrate (211) upstream of the nip (204) to heat the portion (215) of the substrate (211) to a temperature below a melting temperature of the portion (215) of the substrate (211), wherein the temperature below the melting temperature of the portion of the substrate (215) is in a range of about 90 degrees C. to about 160 degrees C.

A4. The method of any one of the preceding paragraphs, comprising cooling the source of vibrational energy (205) or the first device (201).

A5. The method of any one of the preceding paragraphs, wherein the second device (202') is a rotary sonotrode, and wherein the vibration energy is ultrasonic energy.

A6. The method of any one of paragraphs A1-A4, wherein the second device (202) is a blade sonotrode, and wherein the vibration energy is ultrasonic energy.

A7. The method of any one of the preceding paragraphs, comprising providing a plurality of recesses (207) in the outer surface (203) of the first device (201), wherein the recesses (207) have a shape configured to produce the protrusions (209) which are suitable for use in a touch fastener (166).

A8. The method of any one of the preceding paragraphs, wherein the substrate (211) comprises more than one layer (213*a*, 213*b*) or more than one material.

A9. The method of any one of the preceding paragraphs, comprising positioning the vision system (300) downstream of the nip (204).

A10. The method of any one of the preceding paragraphs, wherein the characteristic is a detected defect (209', 209", 209'", 280, 290).

A11. The method of paragraph A10, comprising marking the detected defects (209', 209", 209'", 280, 290) on the substrate (211).

A12. The method of any one of the preceding paragraphs, wherein the protrusions (209) comprise hooks for use on a disposable absorbent article (100), wherein the characteristic is proper formation of the hooks.

A13. The method of any one of the preceding paragraphs, comprising:

winding the substrate (211) after the inspecting step (800);

conveying the substrate (211) into a separate manufacturing operation (700); and identifying the one or more characteristics (209, 280, 290) of the substrate (211) on the separate manufacturing operation (700).

A14. The method of paragraph A13, comprising separating out portions (215) of the substrate (211) having certain of the one or more characteristics (209', 209", 209'", 280, 290).

A15. The method of any one of the preceding paragraphs, comprising:

winding the substrate (211) after the inspecting step (800);

conveying the substrate (211) into an absorbent article manufacturing line (700); and identifying the one or more characteristics (209, 280, 290) of the substrate (211) on the absorbent article manufacturing line (700).

A16. The method of any one of the preceding paragraphs, comprising separating out portions (215) of the substrate (211) having certain of the one or more characteristics (209, 280, 290).

A17. The method of any one of the preceding paragraphs, comprising providing a light source (308) to the substrate (211) during the inspecting step (800), wherein the light source (308) is provided on a first side of the substrate (211) or on the second side of the substrate (211).

A18. The method of any one of the preceding paragraphs, wherein the characteristic is holes (280) or lack thereof in the substrate.

A19. The method of any one of the preceding paragraphs, wherein the inspecting (800) the substrate (211) comprises capturing and storing an electronic image (340) of the one or more characteristics (209, 280, 290).

A20. The method of any one of the preceding paragraphs, wherein the inspecting (800) the substrate comprises using a particle filter (332) to evaluate the one or more characteristics (209, 280, 290) of the substrate (211).

A21. The method of any one of the preceding paragraphs, comprising tracking the one or more characteristics (209, 280, 290) in a quality control system (600).

A22. The method of any one of the preceding paragraphs, wherein the characteristic is a number of protrusions (209).

A23. The method of any one of the preceding paragraphs, wherein the characteristic is a number of properly formed protrusions (209).

A24. The method of any one of the preceding paragraphs, wherein the characteristic is a positive aspect of the substrate (211).

A25. The method of any one of paragraphs A1-A23, wherein the characteristic is a negative aspect of the substrate (209', 280, 290).

A26. The method of any one of the preceding paragraphs, wherein the inspecting the substrate (850) comprises measuring dimensions of the protrusions (209).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of forming protrusions in a portion of a substrate comprising:

providing a first device comprising an outer surface;

providing a second device comprising a source of vibration energy;

forming a nip between the source of vibration energy and the outer surface;

conveying the substrate through the nip;

forming the protrusions in the portion of the substrate in the nip using the source of vibration energy; and inspecting one or more characteristics of the substrate using a vision system, wherein the one or more characteristics comprises a defect; and marking the detected defect on the substrate.

2. The method of claim 1, comprising imparting thermal energy to the portion of the substrate upstream of the nip to heat the portion of the substrate to a temperature below a melting temperature of the portion of the substrate, wherein the temperature below the melting temperature of the portion of the substrate is in a range of about 90 degrees C. to about 160 degrees C.

3. The method of claim 1, wherein the second device comprises a rotary sonotrode, wherein the vibration energy is ultrasonic energy, and wherein the source of vibration energy applies the ultrasonic energy to the substrate intermittently or continuously.

4. The method of claim 1, wherein the second device comprises a blade sonotrode, wherein the vibration energy is ultrasonic energy, and wherein the source of vibration energy applies the ultrasonic energy to the substrate intermittently or continuously.

5. The method of claim 1, comprising providing a plurality of recesses in the outer surface of the first device, wherein the recesses have a shape configured to produce the protrusions which are suitable for use in a touch fastener.

6. The method of claim 1, comprising positioning the vision system downstream of the nip.

7. The method of claim 1, wherein the one or more characteristics comprises proper formation of the protrusions.

8. The method of claim 1, comprising:

winding the substrate after the inspecting step;

conveying the substrate into a separate manufacturing operation; and identifying the one or more characteristics of the substrate on the separate manufacturing operation.

9. The method of claim 8, comprising separating out portions of the substrate having certain of the one or more characteristics.

10. The method of claim 1, comprising:

winding the substrate after the inspecting step;

conveying the substrate into an absorbent article manufacturing line; and identifying the one or more characteristics of the substrate on the absorbent article manufacturing line.

11. The method of claim 10, comprising separating out portions of the substrate having certain of the one or more characteristics.

12. The method of claim 1, comprising providing a light source to the substrate during the inspecting step, wherein the light source is provided on a first side of the substrate or on the second side of the substrate.

13. The method of claim 1, wherein the one or more characteristics comprises holes or lack thereof in the substrate.

14. The method of claim 1, wherein the inspecting the substrate comprises capturing and storing an electronic image of the one or more characteristics.

15. The method of claim 1, wherein the inspecting the substrate comprises using a particle filter to evaluate the one or more characteristics of the substrate.

16. The method of claim 1, comprising tracking the one or more characteristics in a quality control system.

17. The method of claim 1, wherein the one or more characteristics comprises a number of protrusions, a number of properly formed protrusions, a positive aspect of the substrate, or a negative aspect of the substrate.

18. The method of claim 1, wherein the inspecting the substrate comprises measuring dimensions of the protrusions.

* * * * *